US012251807B2

(12) United States Patent
Baba et al.

(10) Patent No.: US 12,251,807 B2
(45) Date of Patent: Mar. 18, 2025

(54) DRIVING TOOLS

(71) Applicant: MAKITA CORPORATION, Anjo (JP)

(72) Inventors: Norikazu Baba, Anjo (JP); Shun Kuriki, Anjo (JP); Kazusa Fukuda, Anjo (JP); Masaya Nagao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 71 days.

(21) Appl. No.: 18/141,718

(22) Filed: May 1, 2023

(65) Prior Publication Data

US 2023/0364762 A1 Nov. 16, 2023

(30) Foreign Application Priority Data

May 13, 2022 (JP) ................................ 2022-079285
Mar. 17, 2023 (JP) ................................ 2023-043043

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ........... B25C 1/06; B25C 1/047; B25C 1/008; B25C 7/00; B25C 1/00–188
See application file for complete search history.

(56) References Cited

U.S. PATENT DOCUMENTS 2,933,290 A * 4/1960 Ryder, Jr. ................ E21B 7/021 173/148
3,589,588 A * 6/1971 Vasku ....................... B25C 1/06 227/132
4,215,808 A * 8/1980 Sollberger ............. B25C 1/041 227/132
4,807,793 A * 2/1989 Ghibely .................... B25C 1/06 227/8
5,388,749 A * 2/1995 Davignon .............. B65C 7/006 227/67
7,152,774 B2 * 12/2006 Chen ......................... B25C 1/06 227/129
7,334,715 B2 * 2/2008 Oda .......................... B25C 1/06 173/205

(Continued)

FOREIGN PATENT DOCUMENTS

WO 2020/059666 A1 3/2020

*Primary Examiner* — Dariush Seif
(74) *Attorney, Agent, or Firm* — Oliff PLC

(57) ABSTRACT

A driving tool includes a piston configured to move in a driving direction due to gas pressure, and a driver configured to move integrally with the piston to strike a fastener. The driver includes a plurality of rack teeth formed along a driving direction. The driving tool includes a wheel having a plurality of engaging portions to engage the plurality of rack teeth at its outer circumference. The driver is moved in a counter-driving direction as the wheel rotates. The plurality of engaging portions of the wheel includes at least one advancing/retracting engaging portion configured to move with respect to a shaft member of the wheel. The driver has a tooth groove between adjacent rack teeth of the plurality of rack teeth. One tooth groove is configured to receive the advancing/retracting engaging portion and has a depth deeper than at least one other tooth groove.

15 Claims, 20 Drawing Sheets

(56) References Cited

U.S. PATENT DOCUMENTS

| | | | | | |
|---|---|---|---|---|---|
| 2005/0082334 | A1* | 4/2005 | Hu | B25C 1/06 | 227/132 |
| 2005/0242154 | A1* | 11/2005 | Leimbach | B25C 1/06 | 227/131 |
| 2006/0027622 | A1* | 2/2006 | Sun | B25C 1/06 | 227/131 |
| 2006/0180631 | A1* | 8/2006 | Pedicini | B25C 1/06 | 227/8 |
| 2009/0090762 | A1* | 4/2009 | Leimbach | B25C 1/06 | 227/136 |
| 2011/0198381 | A1* | 8/2011 | McCardle | B25C 1/06 | 227/8 |
| 2011/0290846 | A1* | 12/2011 | Leimbach | B25C 1/047 | 227/8 |
| 2015/0202755 | A1* | 7/2015 | Tanji | B25C 1/04 | 227/130 |
| 2015/0290786 | A1* | 10/2015 | Largo | B25C 1/06 | 227/8 |
| 2015/0352702 | A1* | 12/2015 | Chien | B25C 1/047 | 227/130 |
| 2016/0229043 | A1* | 8/2016 | Wyler | B25C 1/047 | |
| 2016/0288305 | A1* | 10/2016 | McCardle | B25C 1/047 | |
| 2017/0190037 | A1* | 7/2017 | Sato | B25C 1/06 | |
| 2018/0126528 | A1* | 5/2018 | Pomeroy | B25C 5/13 | |
| 2018/0154505 | A1* | 6/2018 | Sato | B25C 1/047 | |
| 2019/0202042 | A1* | 7/2019 | Wu | B25C 1/047 | |
| 2019/0321955 | A1* | 10/2019 | Carrier | B25C 1/04 | |
| 2019/0375084 | A1* | 12/2019 | Bierdeman | B25C 1/047 | |
| 2020/0114500 | A1* | 4/2020 | Bierdeman | B25C 1/047 | |
| 2020/0164498 | A1* | 5/2020 | Wechselberger | B25C 1/047 | |
| 2020/0338708 | A1* | 10/2020 | Po | B25C 1/047 | |
| 2021/0138623 | A1* | 5/2021 | Bierdeman | B25C 1/041 | |
| 2021/0299835 | A1* | 9/2021 | Ward | B25C 1/005 | |
| 2021/0299837 | A1* | 9/2021 | Garces | B25C 1/06 | |
| 2021/0308852 | A1* | 10/2021 | Ueda | B25C 1/047 | |
| 2021/0347023 | A1* | 11/2021 | Carrier | B25C 1/008 | |
| 2022/0143798 | A1* | 5/2022 | Cholst | B25C 1/041 | |
| 2022/0226977 | A1* | 7/2022 | Nettleton | B25C 5/13 | |
| 2022/0241947 | A1* | 8/2022 | Ward | B25C 1/047 | |
| 2022/0241948 | A1* | 8/2022 | Baba | B25C 1/06 | |
| 2022/0250222 | A1* | 8/2022 | Garces | B25C 1/047 | |
| 2023/0088831 | A1* | 3/2023 | Tam | B25C 1/06 | 227/130 |
| 2023/0202011 | A1* | 6/2023 | Bierdeman | B25C 1/047 | 227/140 |
| 2023/0364762 | A1* | 11/2023 | Baba | B25C 1/047 | |
| 2023/0390906 | A1* | 12/2023 | Julius | B25C 1/008 | |
| 2024/0181616 | A1* | 6/2024 | Yoshikane | B25C 1/06 | |

* cited by examiner

DRIVING TOOLS

CROSS-REFERENCE TO RELATED APPLICATIONS

This application claims priority to Japanese patent application serial numbers 2022-079285, filed May 13, 2022, and 2023-043013, filed Mar. 17, 2023, the content of both of which is incorporated herein by reference in its entirety for all purposes.

BACKGROUND

The present disclosure relates to driving tools for driving fasteners, such as nails and staples, into a workpiece, such as wood or other suitable material.

International Publication No. WO2020/59666 discloses a gas-spring type driving tool that utilizes a thrust force of compressed gas to generate a striking power. The gas-spring type driving tool includes a piston moving upward/downward in a cylinder, and a driver integrally coupled to the piston. The piston and the driver move downward due to gas pressure in a pressure accumulation chamber. The driver strikes and ejects a fastener located therebelow. After the piston and the driver eject the fastener, they return in a counter-driving direction via a lift mechanism.

The driver includes a plurality of engaged portions (rack teeth) formed in alignment in an up/down direction. A lift mechanism includes a wheel having a plurality of engaging portions that are configured to engage the plurality of engaged portions. The plurality of engaging portions are arranged along an outer circumference of the wheel. The wheel is caused to rotate by a driving source such as, for example, an electric motor. The engaging portions sequentially engage the engaged portions of the driver as the wheel rotates after performing a driving operation. This causes the driver and the piston to move upward in the counter-driving direction. As the piston moves upward in the counter-driving direction, the gas pressure in the pressure accumulation chamber is increased. When the driver is moved upward up to an upward movement end position, the engaged state, in which the engaging portions of the lift mechanism engage the engaged portions of the driver, is released. As a result, the driving operation of the driver will be performed again.

The driver may stop in a location above a lower operation end. This may occur, for example, in the case of nail jamming, where a fastener is jammed in a driving channel, or in the case of insufficient driving, where the fastener is not fully driven to a regular depth. However, the wheel still rotates in the same manner as in the case of a normal operation, despite the driver being stopped at an irregular position. The engaging portions thus do not engage the regularly engaging rack teeth, such that the engaging portions and bottom portions of the rack teeth interfere with each other. In the above referenced publication, a technology to allow engaging portions to move with respect to a rotation axis of the wheel has been conventionally considered. Moving the engaging portions in a direction away from a driver prevents undesirable interference between the engaging portions of the wheel and the bottom portions of the rack teeth.

Since the driver is pushed in a driving direction due to the gas pressure in the pressure accumulation chamber, a force is applied to the corresponding engaging portions in a direction away from the driver when engaging with the bottom portions of the rack teeth. Therefore, significant load is applied to the location where the engaging portions and the bottom portions of the rack teeth engage each other. This load is repeatedly applied due to the engagement of the bottom portions of the rack teeth with the engaging portions as the driver repeatedly performs the driving operation. This may possibly cause damage to the engaged portion and/or the rack teeth.

Accordingly, the present disclosure aims to enhance durability, for instance by adjusting the structure of one or more rack tooth of the driver. The modified structure may correspond to a rack tooth that is engagable with the engaging portion of the wheel, wherein at least one engaging portion is movable with respect to the axis about which the wheel primarily rotates.

SUMMARY

According to one aspect of the present disclosure, a driving tool includes a piston that moves in a driving direction due to gas pressure. The driving tool includes a driver, which is provided at the piston and moves integrally with the piston to strike a fastener. The driving tool includes a plurality of rack teeth formed on the driver and along the driver in the driving direction. The driving tool includes a wheel having a plurality of engaging portions at an outer circumference of the wheel. The plurality of engaging portions are configured to engage a plurality of rack teeth. The wheel rotates to move the driver in a counter-driving direction. At least one of the engaging portions of the wheel is configured as an advancing/retracting engaging portion movable with respect to an axis about which the wheel primarily rotates. The driver has tooth grooves between each of the mutually adjacent rack teeth. A tooth groove for receiving the advancing/retracting engaging portion is a deep tooth groove that is deeper than at least one other tooth groove.

Utilizing the above structure, the advancing/retracting engaging portion enters the deep tooth groove to engage a bottom portion of one of the rack teeth. This allows the advancing/retracting engaging portion to first engage the bottom portion of the rack tooth in a position deeper than typically happens with the other engaging portions. The advancing/retracting engaging portion then moves with respect to the axis about which the wheel primarily rotates while the advancing/retracting engaging portion continues to engage the bottom portion of the rack tooth. It is thus possible to suppress strong interference, such as may occur due to collision against the bottom portions of the rack teeth while the advancing/retracting engaging portion is moving. This prevents damage to the rack teeth due to engagement with the advancing/retracting engaging portion, and enhances the durability and/or longevity of the rack teeth and/or engaging portions of the wheel.

DETAILED DESCRIPTION

Figure 1:
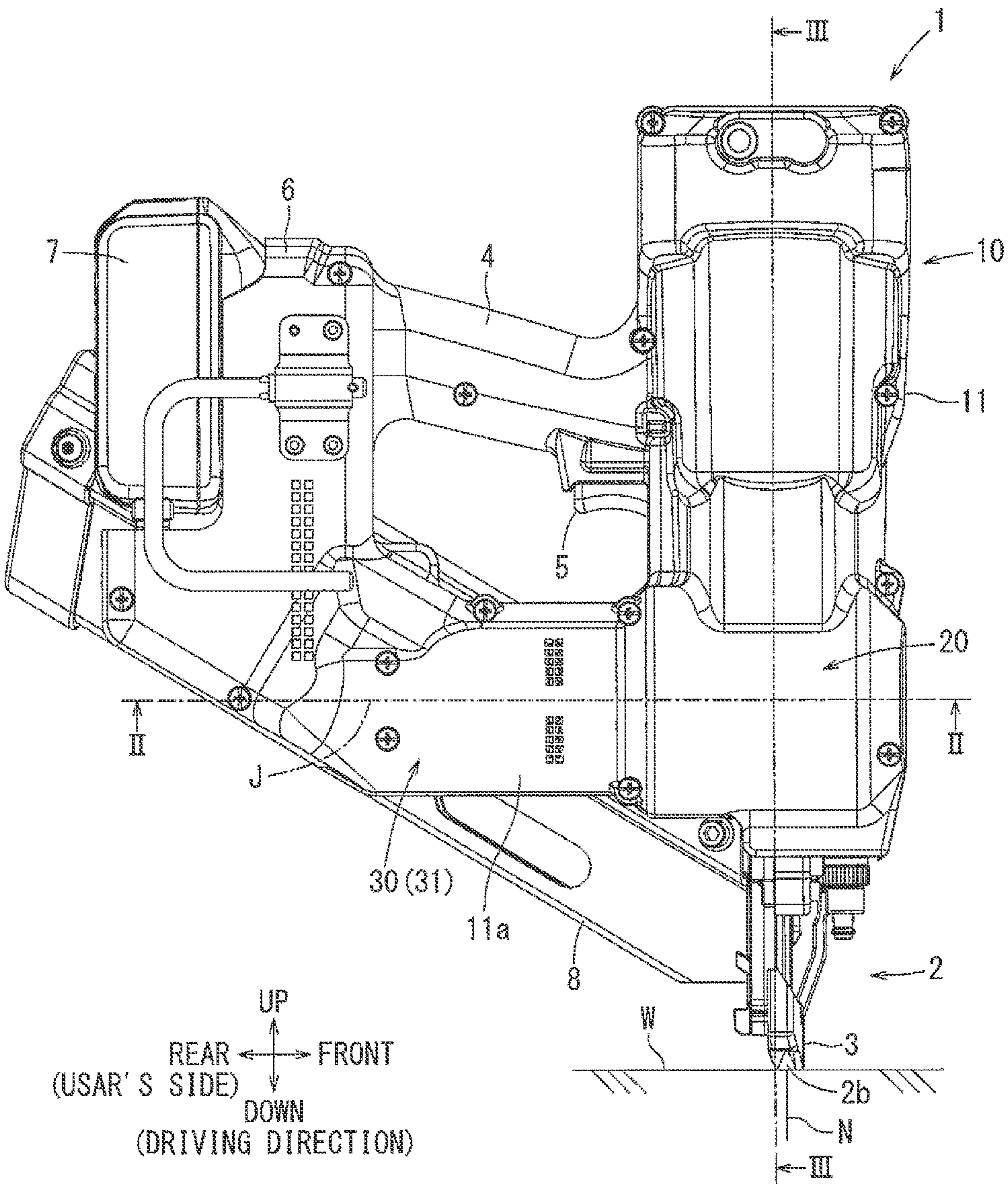
FIG. 1 is a side view of a driving tool.

According to an aspect of the present disclosure, a plurality of rack teeth includes a center rack tooth adjacent a deep tooth groove in the counter-driving direction, and an upper rack tooth adjacent the center rack tooth in the counter-driving direction. A pitch between the center rack tooth and the upstream rack tooth is wider than a pitch between at least one other pair of mutually adjacent rack teeth. When the advancing/retracting engaging portion moves with respect to the rotation axis of the wheel, the driver slightly returns in the driving direction by a movement amount of the advancing/retracting engaging portions. At this moment, the engaging portion engaged with the bottom portion of the upstream rack tooth may retract from the tooth groove without interfering with the center rack tooth and the upstream rack tooth. This is done in part by providing a wider pitch between the center rack tooth and the upstream rack tooth. As a result, the upstream rack tooth and the center rack tooth are prevented from being damaged.

According to another aspect of the present disclosure, the plurality of rack teeth includes a downstream rack tooth adjacent to the center rack tooth on a side of the driving direction of the center rack tooth. The pitch between the center rack tooth and the downstream rack tooth is narrower than the pitches between at least one pair of other mutually adjacent rack teeth. Therefore, at the timing after the advancing/retracting engaging portions have moved with respect to the axis about which the wheel primarily rotates, the engaging portions can smoothly enter toward the bottom portion of the downstream rack tooth without interfering with the downstream rack tooth. As a result, the downstream rack tooth is prevented from being damaged.

According to another aspect of the present disclosure, the downstream rack tooth has a thinner tooth thickness than those of the center rack tooth and the upstream rack tooth. Therefore, when the advancing/retracting engaging portion enters the deep tooth groove, it is possible to prevent the advancing/retracting engaging portion from interfering with the downstream rack tooth. As a result, the downstream rack tooth is prevented from being damaged.

According to another aspect of the present disclosure, the driving tool includes a shaft member rotatably attached to a tool body. The wheel is radially slidably attached to the shaft member. The wheel rotates with the shaft member about an axis of the shaft member, and all of the plurality of engaging portions radially slide with respect to the shaft member. Therefore, the advancing/retracting engaging portion moves integrally with the other engaging portions and the wheel with respect to the shaft member. It is thus possible to prevent the advancing/retracting engaging portion engaged with the bottom portion of the rack tooth from unintentionally moving alone. This may prevent unintentional disengagement of the advancing/retracting engaging portion from the bottom portion of the rack tooth.

According to another aspect of the present disclosure, the advancing/retracting engaging portion enters the deep tooth groove and is pressed against the groove bottom of the deep tooth groove to move with respect to the axis about which the wheel primarily rotates. Therefore, while the advancing/retracting engaging portion is moving, the advancing/retracting engaging portion continuously engages the bottom portion of the rack tooth. It is thus possible to prevent the advancing/retracting engaging portion from suddenly being separated from the bottom portion of the rack tooth. As a result, it is possible to prevent collision between the advancing/retracting engaging portion against the bottom portion of the rack tooth, and to prevent damage to the rack teeth.

According to another aspect of the present disclosure, the advancing/retracting engaging portion receives a force along the driving direction from the groove bottom of the deep tooth groove. The advancing/retracting engaging portion can move in the driving direction while the wheel is rotating. Therefore, while the advancing/retracting engaging portion is moving, the load in the driving direction to be applied by the advancing/retracting engaging portion to the bottom portion of the rack tooth can be minimized. This enhances the longevity of the rack tooth configured to be engaged with the advancing/retracting engaging portion.

According to another aspect of the present disclosure, the wheel slides between an initial position, where the advancing/retracting engaging portion is separated from the shaft member, and a shifted position where the advancing/retracting engaging portion has approached close to the shaft member. One of the plurality of the engaging portions is a first engaging portion, which first engages the driver when the driver is to be moved in the counter-driving direction. The plurality of the engaging portions also includes an externally positioned engaging portion that is centered about an axis of the rotation shaft and is positioned outside a reference circle passing through the first engaging portion when the wheel is positioned at the initial position. The plurality of engaging portions also includes an internally positioned engaging portion that is positioned inside the reference circle.

Therefore, while the wheel rotates through one revolution, there is a timing at which the wheel is positioned at the initial position, a timing at which the wheel is shifting from the initial position to the shifted position, a timing at which the wheel is positioned at the shifted position, and a timing at which the wheel is being shifted from the shifted position to the initial position. At any of these timings, an externally positioned engaging portion or an internally positioned engaging portion may be provided to allow at least one engaging portion to engage a bottom portion of a rack tooth. This ensures a stable returning motion of the driver due while rotating the wheel.

According to another aspect of the present disclosure, the plurality of engaging portions may be disposed at the wheel so as to come in contact with the plurality of rack teeth at equal angular intervals while the wheel is rotating. Therefore, it is possible to return the driver to a stand-by position at a substantially constant speed by rotating the wheel at a substantially constant speed. This allows the engaging portion to engage the bottom portion of the rack teeth without providing, for example, a speed adjusting mechanism for adjusting the rotation speed of the wheel. As a result, a mechanism for rotating the wheel can be made more compact.

According to another aspect of the present disclosure, the plurality of engaging portions includes a first engaging portion, which first engages the driver when the driver is to be moved in the counter-driving direction, and a second engaging portion, which engages with the driver after the first engaging portion. The advancing/retracting engaging portion is the second engaging portion. Therefore, when the driver stops at an irregular position due to nail jamming or insufficient driving, the engaging portion that first interferes with a rack tooth is the first engaging portion. The other engaging portions after the second engaging portion cause the driver to move in the counter-driving direction without interfering with the rack teeth by eliminating the interference between the first engaging portion and the misaligned rack tooth. By adopting a structure to move the wheel from the initial position to the shifted position at a time when the second engaging portion is engaged with the bottom portion of the rack tooth, the first engaging portion may be smoothly retracted from the tooth groove between the rack teeth when the first engaging portion interferes with the rack tooth. Thus, the returning motion of the driver can be continued well.

According to another aspect of the present disclosure, the driving tool includes a piston, which moves in the driving direction due to gas pressure. The driving tool includes a driver, which is provided at the piston and moves integrally with the piston to strike a fastener. The driving tool includes a plurality of rack teeth formed at the driver and along the driver in the driving direction. The driving tool includes a wheel having a plurality of engaging portions at its outer circumference. The plurality of engaging portions are configured to engage a plurality of rack teeth. The driving tool includes a shaft member acting as a rotation shaft of the wheel. The shaft member is attached to the wheel in a non-rotatably and radially slidably manner. The wheel rotates to move the driver in the counter-driving direction. The wheel slides from the initial position to the shifted position, which is away from the driver with respect to the shaft member, when causing the driver to move in the counter-driving direction. The driver has a tooth groove between each of mutually adjacent rack teeth. The tooth grooves include a shallow tooth groove to engage one of the engaging portions when the wheel is at the initial position, and a deep tooth groove to engage one of the engaging portions when the wheel shifts from the initial position to the shifted position or when the wheel has been shifted to the shifted position. The deep tooth groove is deeper than the shallow tooth groove.

Therefore, the engaging portion engages the shallow groove when the wheel is at the initial position. The engaging portion engages the deep tooth groove when the wheel is being shifted from the initial position to the shifted position or when positioned in the shifted position. It is thus possible to maintain a state in which one of the engaging portions is engaged with the shallow tooth groove or deep tooth groove while the driver is moving in the counter-driving direction. In particular, when the wheel is shifting from the initial position to the shifted position, the engaging portion is also shifted in a direction to retract it from the deep tooth groove. The engaging portion, which engages the tooth groove while or after being shifted from the initial position to the shifted position, is disposed at an external position of the wheel so as not to be disengaged after being shifted. Providing an engagement portion at the external position allows the engaging portion to stay in the deep tooth groove even when the wheel is shifting to the shifted position. Accordingly, it is possible to prevent the rack teeth from disengaging from the engaging portions while the driver is being shifted in the counter-driving direction. This prevents the driver from unintentionally being returned to the driving direction. Further, it is possible to prevent the engaging portions from interfering with the bottom portions of the rack teeth positioned on a side of the driving direction of the deep tooth groove by providing the deep tooth groove with a deeper depth. This prevents damage to the rack teeth due to force received from the engaging portion, and enhances the durability and/or longevity of the rack teeth.

According to another aspect of the present disclosure, the wheel returns from the shifted position to the initial position when moving the driver to the counter-driving direction. The tooth groove includes a second deep tooth groove, which engages with one of the engaging portions when the wheel returns from the shifted position to the initial position. The second deep tooth groove is deeper than the shallow tooth groove. The shaft member rotates about 180° from the time when the wheel is shifted from the initial position to the shifted position to the time when it returns to the initial position. Therefore, the engaging portion (e.g., an advancing/retracting engaging portion) being engaged immediately before the wheel is returned from the shifted position to the initial position has approached the driver. Therefore, the engaging portion can maintain a state in which the wheel is engaged with the second deep tooth groove as the wheel returns from the shifted position to the initial position. When the wheel returns from the shifted position to the initial position, the engaging portion also shifts in a direction retracting from the second deep tooth groove. Since the engaging portion engaging the driver before the wheel is returned to the initial position has approached the driver, the engaging potion can stay in the second deep tooth groove even when the wheel has been returned to the initial position. Therefore, it is possible to prevent the rack teeth on the side of the driving direction of the second deep tooth groove from disengaging from the engaging portion. Accordingly, the driver can be prevented from unintentionally being returned in the driving direction while the driver is being moved in the counter-driving direction. It is also possible to prevent the engaging portion engaging the driver before the wheel is returned to the initial position from interfering with the bottom portion of the rack tooth positioned on the side of the second deep tooth groove in the driving direction by providing the second deep tooth groove have a deeper depth. This prevents damage to the rack teeth on the side of the second deep tooth groove in the driving direction due to a force received from the engaging portion. Accordingly, durability and/or longevity can be enhanced.

According to another aspect of the present disclosure, each of the plurality of rack teeth includes an engaged surface to engage a corresponding engaging portion of the wheel. The plurality of rack teeth includes a post-advanced rack tooth configured to engage one of the engaging portions when the wheel is at the shifted position. The plurality of rack teeth also include a returning rack tooth configured to engage one of the engaging portions when the wheel returns from the shifted position to the initial position. The engaged surface of the returning rack tooth is inclined, with respect to an orthogonal plane orthogonal to the axial direction of the driver, in a direction toward the driving direction from the tooth tip to the tooth root of the returning rack tooth. The engaged surface of the returning rack tooth is more inclined compared to the engaged surface of the post-advanced rack tooth.

Therefore, the engaging portion engages the engaged surface of the returning rack tooth at an earlier timing than would normally be the case when an engaging portion engages the engaged surface of the post-advanced rack tooth. This may accelerate the timing at which the wheel returns from the shifted position to the initial position. Accordingly, a shift direction of the wheel may approach a direction orthogonal to the driving direction of the driver. This may also reduce the distance that the engaging portions shift toward the driving direction of the driver when the wheel returns from the shifted position to the initial position. It is thus possible to reduce the impact force generated between the engaging portions and the engaged surface of the returning rack tooth at the moment when the wheel is being returned to the initial position. This prevents damage to the returning rack tooth, and enhances the durability and/or longevity of the returning rack tooth.

According to another aspect of the present disclosure, the plurality of rack teeth include an advancing rack tooth configured to engage one of the engaging portions when the wheel is shifting from the initial position to the shifted position. The engaged surface of the advancing rack tooth is inclined, with respect to an orthogonal plane orthogonal to the axial direction of the driver, in a direction toward the driving direction from the tooth tip to the tooth root of the advancing rack tooth. The engaged surface of the advancing rack tooth is more inclined than the engaged surface of the post-advanced rack tooth.

Therefore, the engaging portion engages the engaged surface of the advancing rack tooth at relatively an earlier timing than when an engaging portion engages the engaged surface of the post-advanced rack tooth. This may accelerate the timing at which the wheel shifts from the initial position to the shifted position. Accordingly, the shift direction of the wheel may approach a direction orthogonal to the driving direction of the driver. This may reduce the distance that the engaging portions shift in the driving direction of the driver when the wheel shifts from the initial position to the shifted position. It is thus possible to reduce the impact force generated between the engaging portion and the engaged surface of the advancing rack tooth at the moment when the wheel shifts to the shifted position. This prevents damage to the advancing rack tooth, and enhances the durability and/or longevity of the advancing rack tooth.

According to another aspect of the present disclosure, the engaged surface of the post-advanced rack tooth is inclined, with respect to an orthogonal plane orthogonal to the axial direction of the driver, in a direction toward the driving direction from the tooth tip to tooth root of the post-advanced rack tooth. Therefore, it is possible to accelerate the timing of transferring from the preceding engaging portion engaged with the engaged surface of the rack tooth preceding the post-advanced rack tooth to the engaging potion to engage the engaged surface of the post-advanced rack tooth. Thus, the engaging portion and the engaged surface of the post-advanced rack tooth engage before the preceding engaging portion shifts to the tip end of the preceding rack tooth. This may reduce the bending moment generated at the root of the preceding rack tooth, thereby enhancing the durability and/or longevity of the preceding rack teeth.

Hereinafter, one embodiment of the present disclosure will be described with reference to FIGS. 1 to 10. As one example of a driving tool, a gas-spring type driving tool 1 is illustrated. The gas-spring type driving tool 1 utilizes gas pressure in a pressure accumulation chamber located above a cylinder as a thrust force for driving a fastener N. In the following description, a driving direction of the fastener N is a downward direction, and a counter-driving direction is an upward direction. A user of the driving tool 1 is positioned at a substantially left side of the driving tool 1 in FIG. 1. The user is positioned in a rearward direction (user's side) of the driving tool 1 and a direction opposite to the rearward direction is a frontward direction. The left and right directions are determined on the basis of the user.

Figure 3:
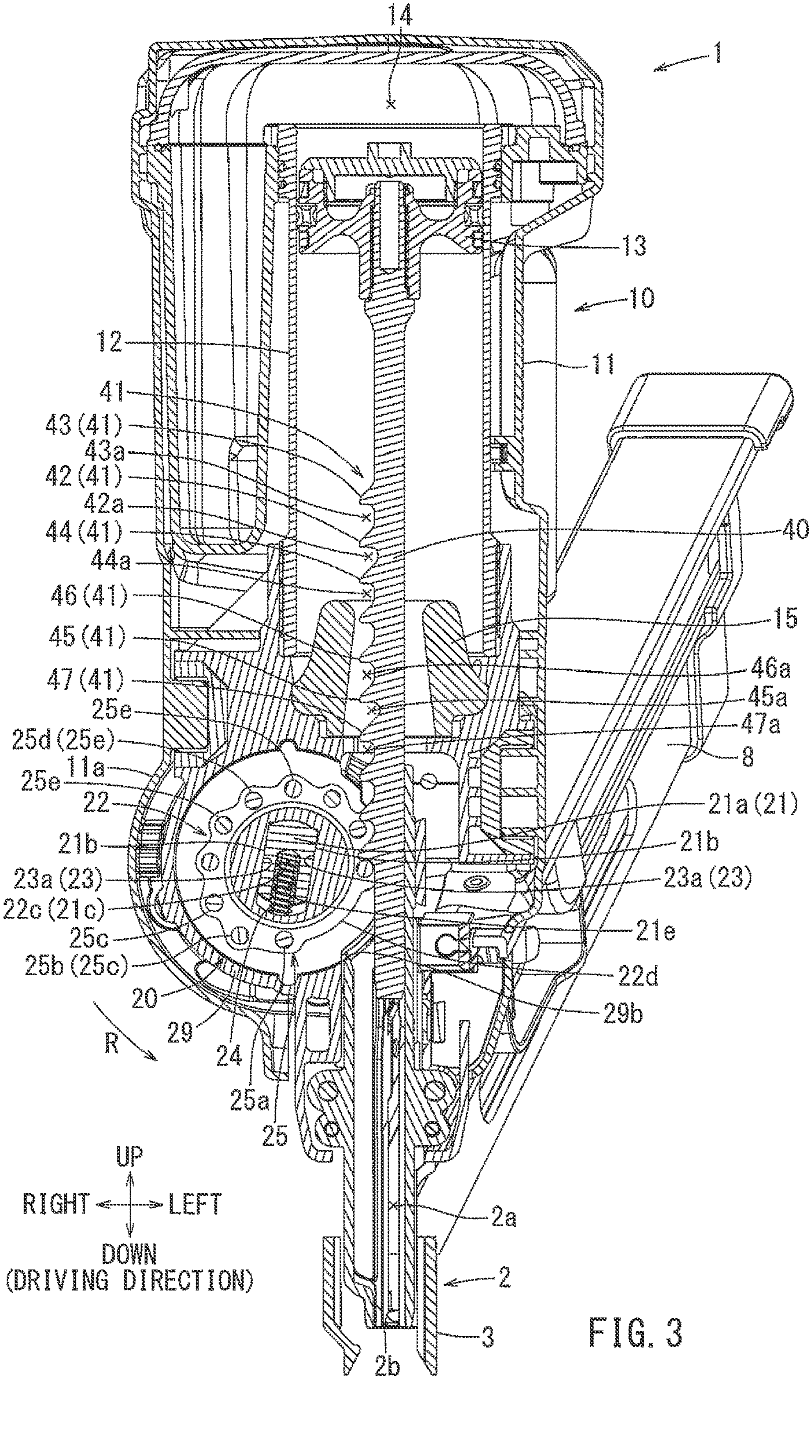
FIG. 3 is a cross-sectional view taken along a line III-III in FIG. 1.

As shown in FIGS. 1 and 3, the driving tool 1 includes a tool body 10. The tool body 10 is configured to receive a cylinder 12 within a substantially cylindrical body housing 11. A piston 13 is accommodated within the cylinder 12 so as to be vertically and reciprocally movable. An upper part of the cylinder 12, which may be located above the piston 13, communicates with a pressure accumulation chamber 14. The pressure accumulation chamber 14 is filled with compressed gas, such as, for example, air. The gas pressure within the pressure accumulation chamber 14 acts as a thrust force acting on a top surface of the piston 13 in a direction to move the piston 13 downward.

As shown in FIG. 3, a lower part of the cylinder 12 communicates with a driving channel 2*a* of a driving nose 2. The driving nose 2 may be provided at a lower part of the tool body 10. The driving nose 2 is coupled to a magazine 8, which may be loaded with a plurality of fasteners N (see FIG. 1). The fasteners N are fed from the inside the magazine 8 into the driving channel 2*a* one by one in a vertically extended orientation. A vertically slidable contact arm 3 is provided at a lower part of the driving nose 2. When the contact arm 3 comes in contact with a workpiece W, the contact arm 3 may be moved upward.

As shown in FIG. 3, a vertically elongated driver 40 is coupled to a lower side of the piston 13. A lower part of the driver 40 is configured to enter into the driving channel 2*a*. The driver 40 moves downward within the driving channel 2*a* due to gas pressure within the pressure accumulation chamber 14, the gas pressure acting on an upper side of the piston 13. A lower end of the driver 40 is configured to strike one fastener N fed into the driving channel 2*a*. The struck fastener N is ejected from an ejection port 2*b* of the driving nose 2. The ejected fastener N is driven into the workpiece W. A downward movement end damper 15, which is for adsorbing the impact of the piston 13 at a downward movement end of the piston 13, is arranged at a lower portion of the cylinder 12.

As shown in FIG. 3, a plurality of rack teeth 41 are provided on a right side of the driver 40. In the present embodiment, ten rack teeth 41 are aligned in a longitudinal direction (up/down direction) of the driver 40. Each of the rack teeth 41 is provided so as to project toward the right. Each rack tooth 41 is provided with a bottom portion oriented on a side of the driving direction (downward) of the rack tooth 41. The bottom portions of the rack teeth 41 (which may be an embodiment of an engaged surface) are configured to engage engaging portions 25 of a lift mechanism 20, an embodiment of which will be described later.

As shown in FIG. 1, a grip 4 for a user to grasp is provided at a rear part of the tool body 10. A trigger 5 for a user to operate with his/her fingertip is provided at a front lower side of the grip 4. A pulling operation of the trigger 5 may become functional when the contact arm 3 is pressed against the workpiece W to relatively move the contact arm 3 upward with respect to the driving nose 2. A battery mount 6 is provided at a rear part of the grip 4. A battery pack 7 is removably mounted on a rear side of the battery mount 6. The battery pack 7 may be removed from the battery mount 6 and be recharged with a separately prepared charger. The battery pack 7 may be used as a power source for other power tools. The battery pack 7 serves as a power source for feeding electric power to a drive unit 30, which will be described later.

As shown in FIG. 3, a lift mechanism 20 is coupled to a right side of the driving nose 2. The lift mechanism 20 includes a function for returning the piston 13 and the driver 10 upward after a fastener N has been struck. The gas pressure within the pressure accumulation chamber 14 is increased as the piston 13 is returned upward by the lift mechanism 20.

As shown in FIG. 1, the drive unit 30, which is configured to operate the lift mechanism 20, is dispose in parallel to or collinear with and at a rear part of the lift mechanism 20. The lift mechanism 20 and the drive unit 30 are accommodated within a substantially cylindrical drive unit case 11*a*. The drive unit case 11*a* is configured to connect a lower part of the body housing 11 with a lower part of the battery mount 6. The drive unit case 11*a* may be provided integrally with the body housing 11.

Figure 2:
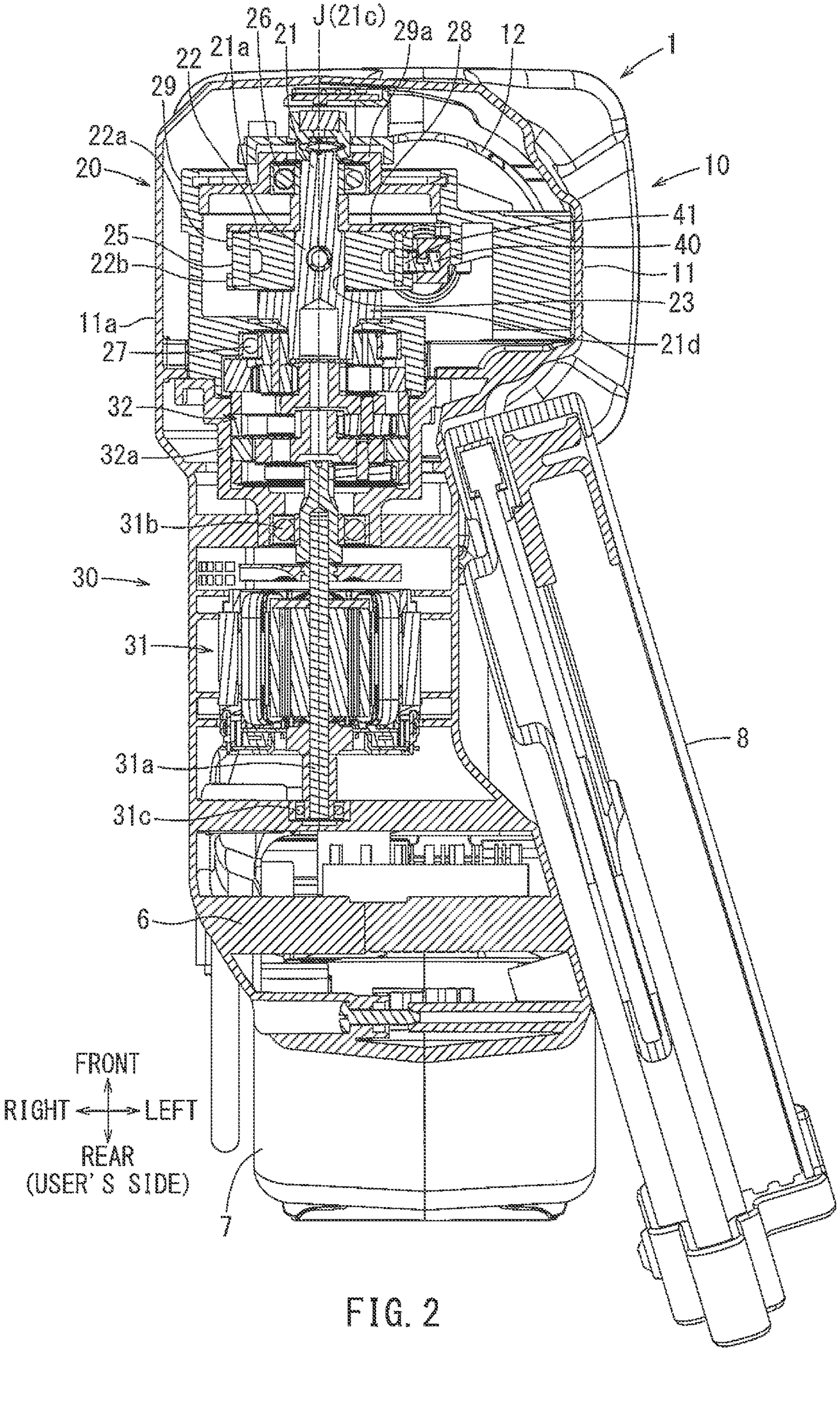
FIG. 2 is a cross-sectional view taken along a line II-II in FIG. 1.

As shown in FIG. 2, the drive unit 30 includes an electric motor 31 as a drive source. The electric motor 31 is accommodated in an orientation with an axis of an output shaft 31 (which may correspond to a motor axis J) extending along a front/rear direction orthogonal to the driving direction (orthogonal direction to a sheet in FIG. 2). The electric motor 31 uses the electric power of the battery pack 7 as a power source and is started, for example, by a pulling operation of the trigger 5.

As shown in FIG. 2, the output shaft 31*a* of the electric motor 31 is rotatably supported by the drive unit case 11*a* via bearings 31*b*, 31*c*. A front part of the output shaft 31*a* is connected to a reduction gear train 32. The reduction gear train 32 is supported on an inner circumferential side of a substantially cylindrical gear train case 32*a*, which is accommodated within the drive unit case 11*a*. Three stages of planetary gears are used for the reduction gear train 32. The three stages of planetary gears are coaxial to each other and may also be arranged coaxial to the motor axis J. The rotational output of the electric motor 31 is reduced in speed by the reduction gear train 32. The speed reduced output of the electric motor 31 is output to the lift mechanism 20.

As shown in FIG. 2, the lift mechanism 20 includes a shaft member 21 connected to the reduction gear train 32 and a wheel 22 supported by the shaft member 21. The lift mechanism 20 is accommodated within a substantially cylindrical mechanism case 29, which is accommodated within the driver unit case 11*a*. A rotation axis 21*c* of the shaft member 21 may be coaxial with the motor axis J. A front part of the mechanism case 29 is covered by a cover 29*a*. A front end of the shaft member 21 is rotatably supported by the cover 29*a* via a bearing 26 retained within the mechanism case 29. A rear end of the shaft member 21 is connected to a final stage carrier of the reduction gear train 32. The final stage carrier of the reduction gear train 32 is rotatably supported by the mechanism case 29 via a bearing 27, the bearing 27 being provided on an outer circumferential side of the final stage carrier of the reduction gear train 32. As the electric motor 31 operates, the shaft member 21 of the lift mechanism 20 and the wheel 22 rotates integrally, for instance in a direction indicated by an arrow R (counterclockwise direction in FIG. 3) shown in FIG. 3. Rotating the wheel 22, in the arrow R direction, causes the driver 40 to lift upward.

Figure 4:
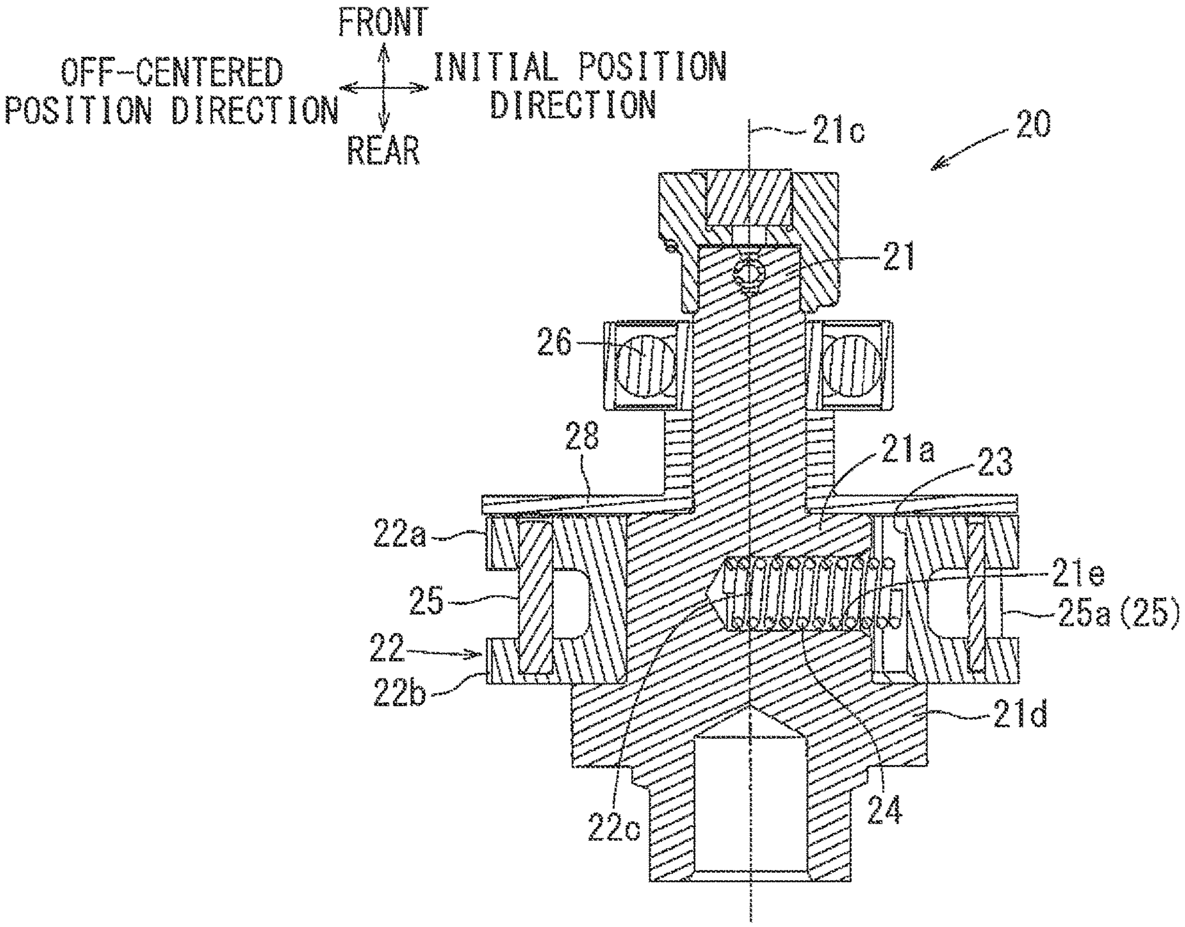
FIG. 4 is a vertical sectional view of a lift mechanism when a wheel is positioned at an initial position.
Figure 5:
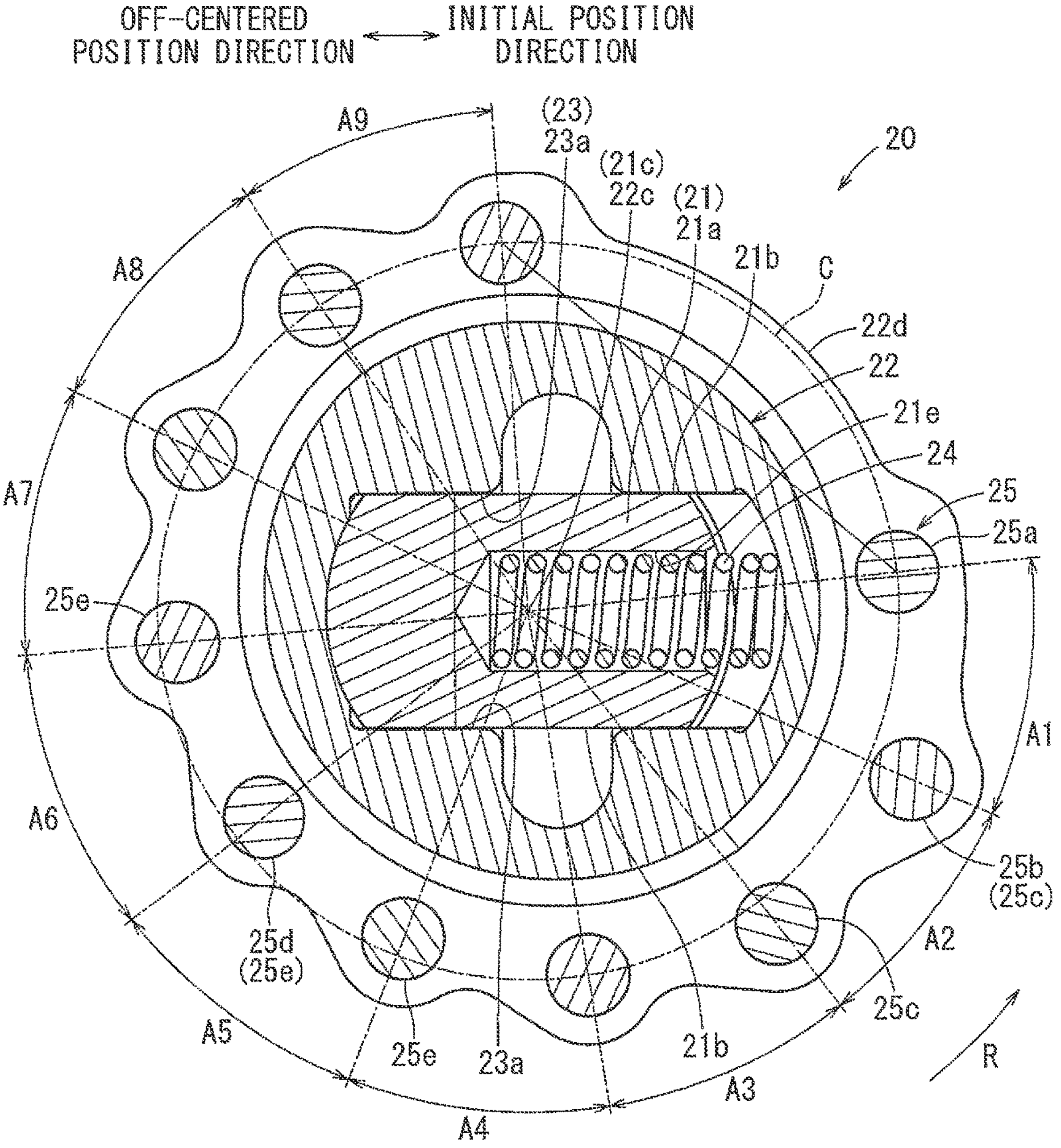
FIG. 5 is a cross-sectional view of the lift mechanism when the wheel is positioned at the initial position.

As shown in FIGS. 4 and 5, a supporting member 21*a* for supporting the wheel 22 is provided at the center of the shaft member 21 in the front/rear direction. Although the supporting member 21*a* has a substantially columnar shape, it includes a pair of supporting planes 21*b*, each of which extend radially and parallel to each other. The supporting member 21*a* includes a spring accommodating portion 21*e* between the pair of the supporting planes 21*b*. The spring accommodating portion 21*e* is recessed along an extending direction of the pair of supporting planes 21*b*. The spring accommodating portion 21*e* opens at an end face of the supporting member 21*a* and toward a side of the initial position direction. A spring 24, which is configured to bias the wheel 22 in a radial direction of the wheel 22, is accommodated within the spring accommodating portion 21*e*.

As shown in FIG. 4, a flange 21*d* is provided at a rear part of the shaft member 21. The flange 21*d* projects in a discoidal shape radially outward of the supporting member 21*a* and is generally positioned behind the supporting member 21*a*. A front side of the flange 21*d* comes in contact with a rear side of the wheel 22. A cover member 28 is attached to a front part of the shaft member 21 and is generally positioned ahead of the supporting member 21*a*. The cover member 28 is provided in a discoidal shape having a diameter substantially equal to the outer circumferential edge of the wheel 22. The cover member 28 is attached in front of the wheel 22 and the supporting member 21*a*. A rear side of the cover member 28 comes in contact with the front side of the wheel 22. The wheel 22 is interposed between the flange 21*d* and the cover member 28, such that the wheel 22 is restricted from moving in the front/rear direction.

Figure 6:
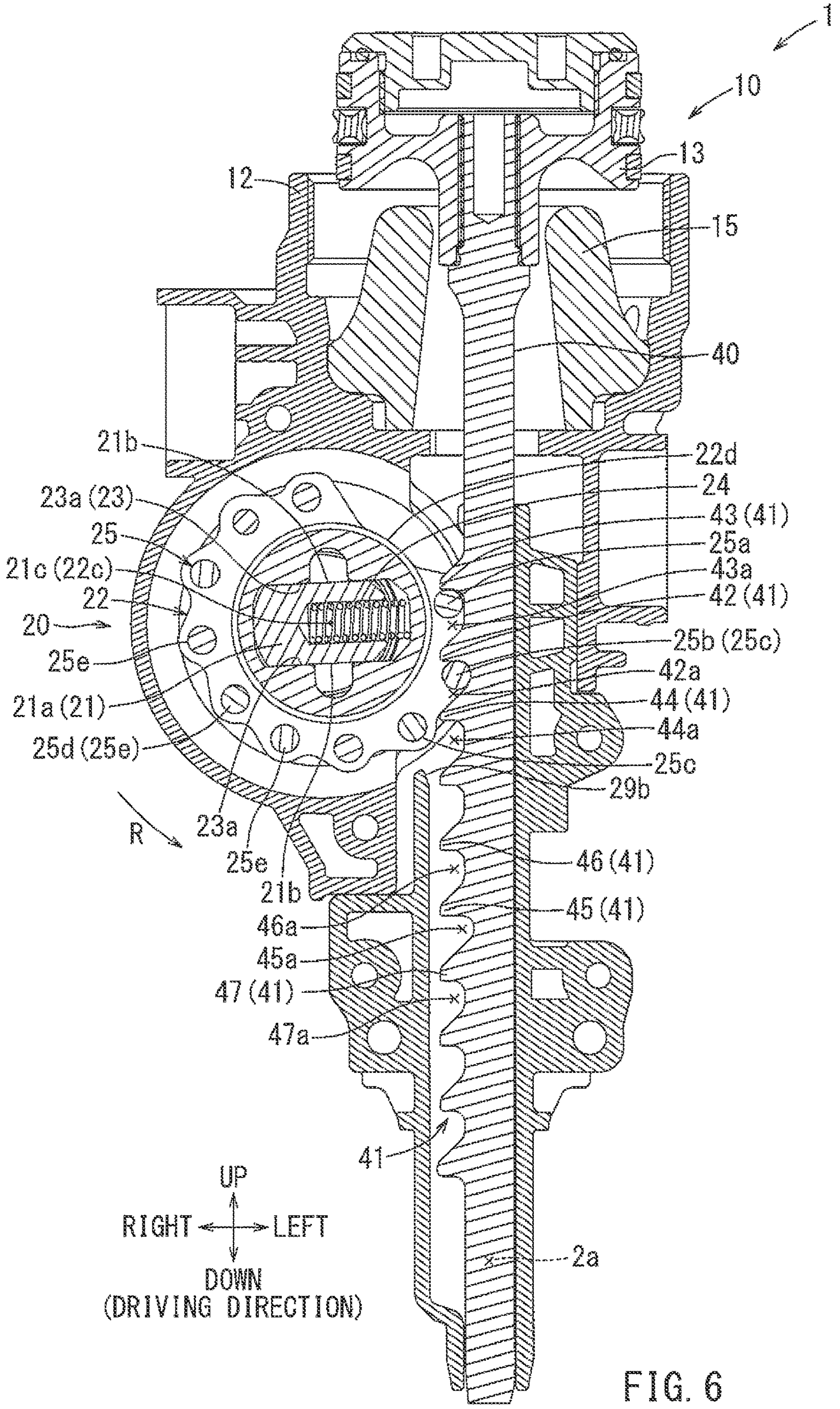
FIG. 6 is a cross-sectional view of the lift mechanism and a driver. This figure illustrates a state in which the wheel is positioned at the initial position and a second engaging portion is engaged with a bottom portion of a second engaged portion.

As shown in FIGS. 4 and 5, an attachment hole 23, into which the supporting member 21*a* is to be inserted, is provided at the center of the wheel 22. An inner wall surface of the attachment hole 23 is provided with a pair of slide surfaces 23*a*, which extend radially and in parallel to each other. The distance between the pair of slide surfaces 23 is substantially equal to the distance between the pair of supporting planes 21*b* of the supporting member 21*a*. As the supporting member 21*a* is inserted into the attachment hole 23, each slide surface 23*a* and each supporting plane 21*b* face and come in contact with each other. The wheel 22 is displaceable within a certain range in a radial direction with respect to the shaft member 21. The slide surfaces 23*a* are slidably in contact with the supporting plane 21*b*. For the purpose of this discussion, a position of the wheel 22 when the center 22*c* of the wheel 22 is positioned on the rotation axis 21*c* of the shaft member 21, an embodiment of which is shown in FIG. 6, will be referred to as an initial position. For the purpose of this discussion, a position of the wheel 22 when the center 22*c* of the wheel 22 is most off-centered from the rotation axis 21*c* of the shaft member 21, an embodiment of which is shown in FIG. 8, will be referred to as a shifted position. The position of the wheel 22 shown in FIGS. 7 and 9 corresponds to an intermediate position between the initial position and the shifted position.

As shown in FIGS. 4 and 5, the compression spring 24, which is accommodated within the spring accommodating portion 21*e* of the supporting member 21*a*, biases a wall surface of the attachment hole 23 in a radial direction of the wheel 22. The wheel 22 is biased, with respect to the supporting member 21*a*, in a direction from the shifted position toward the initial position. Therefore, when an external force is not acting on the wheel 22, the wheel 22 is retained in the initial position. When an external force in excess of a certain level (e.g., in excess of the spring force of the compression spring 24) in a direction toward the shifted position acts on the wheel 22, the wheel 22 shifts from the initial position to the shifted position against the biasing force of the compression spring 24.

As shown in FIG. 5, a plurality of engaging portions 25 are attached along the outer circumferential edge of the wheel 22. In the present embodiment, for example, ten engaging portions 25 may be provided. A columnar shaft member (e.g., a pin) may be used for each of the engaging portions 25.

As shown in FIG. 3, a left part of the wheel 22 enters into the driving channel 2*a* via a window 29*b* provided in the mechanism case 29. Each of the engaging portions 25 of the wheel 22 is configured to be engageable with a bottom portion of a rack tooth 41 of the driver 40 when the engaging portion 25 is within the driving channel 2*a*. At least one of the engaging portions 25 engages a bottom portion of a rack tooth 41 of the driver 40 while the wheel 22 rotates, for instance in the direction indicated by the arrow R in FIG. 3. This engagement and rotation causes the driver 40 and the piston 13 to return upward.

As shown in FIG. 4, the wheel 22 includes a front flange 22*a* and a rear flange 22*b* positioned parallel to and at certain interval in a front/rear direction from the front flange 22*a*. The front flange 22*a* and the rear flange 22*b* are formed to have a similar radially projecting shape. Each of the engaging portions 25 is retained in a predetermined circumferential position of the wheel 22 by an insertion hole formed in the front flange 22*a* and a groove hole formed in the rear flange 22*b*. Each of the engaging portions 25 is supported by the wheel 22 so as to be rotatable about its axis. Therefore, it is possible to prevent a single region on an outer circumferential surface of each engaging portions 25 from coming continuously in contact with the rack teeth 41. This may reduce wear of the engaging portions 25.

As shown in FIG. 5, some of the plurality of engaging portions 25 have different distances from the center 22*c* of the wheel 22. Further, the circumferential interval between two adjacent engaging portions 25 may be different, such that they have different circumferential angles with respect to the center 22*c*. In the present embodiment, ten engaging portions 25 are disposed at predetermined intervals in an area over about three-quarters of the circumference of the wheel 22. No engaging portions 25 are disposed in an area over about one-quarter of the circumference of the wheel 22. Hereinafter, a circumferential area where no engaging portions 25 are disposed will be referred to as a relief section 22*d*.

As shown in FIG. 5, the engaging portion 25 immediately after the relief section 22*d* in a rotation direction (counter-clockwise in FIG. 5) of the wheel 22 will be referred to as a first engaging portion 25*a*. The center of the first engaging portion 25*a* is located on the reference circle C at a reference distance from the rotation axis 21*c* of the shaft member 21 when the wheel 22 is positioned at the initial position. The engaging portion 25 arranged immediately after the first engaging portion 25*a* in the rotation direction of the wheel 22 will be referred to as a second engaging portion 25*b*. The second engaging portion 25*b* is movable relative to the rotation axis 21*c*, and it will also be referred to as an advancing/retracting engaging portion 25*b* in the present disclosure. The engaging portion 25 arranged at a fifth position from the engaging portion 25*a* in the rotation direction of the wheel 22 will be referred to as a sixth engaging portion 25*d*. The sixth engaging portion 25*d* is also movable relative to the rotation axis 21*c*, and it will therefore also be referred to as an advancing/retracting engaging portion 25*d* in the present disclosure. The two engaging portions 25 arranged immediately after the first engaging portion 25*a* in the rotation direction of the wheel 22 will each be referred to as an externally positioned engaging portion 25*c*. The center of each of the externally positioned engaging portions 25*c* is located radially outward of the reference circle C. Three engaging portions 25, which include the sixth engaging portion 25*d* and the engaging portions 25 to its front and rear in the rotation direction of the wheel 22, will be referred to as internally positioned engaging portions 25*e*. The center of each of the internally positioned engaging portion 25*e* is located radially inward of the reference circle C.

As shown in FIG. 5, an angle is formed between two adjacent engaging portions with respect to the center 22*c* of the wheel 22. Each angle in the rotation direction of the wheel 22 with the first engaging portion 25*a* as an initial point will be referred to as an arc angle A1, A2, A3, A4, A5, A6, A7, A8, and A9. One of the two engaging portions 25 defining the first and third arc angles A1, A3 is an externally positioned engaging portion 25*c*. Both of the two engaging portions 25 defining the second arc angle A2 are externally positioned engaging portions 25*c*. One of the two engaging portions 25 defining the fourth and seventh arc angles A4, A7 is an internally positioned engaging portion 25*e*. The arc angles A1 to A9 are typically smaller when the distance from the center of each of the engaging portions 25 to the center 22*c* of the wheel 22 is longer, and is larger when the distance is shorter. Therefore, in this embodiment the first, second, and third arc angles A1, A2, A3 are smaller than the eighth and ninth arc angles A8, A9. The second arc angle A2 is smaller than the first and third arc angles A1, A3. The fourth through seventh arc angles A4, A5, A6, A7 are larger than the eighth and ninth arc angles A8, A9. The fifth and sixth arc angles A5, A6 are larger than the fourth and seventh arc angles A4, A7.

Figure 10:
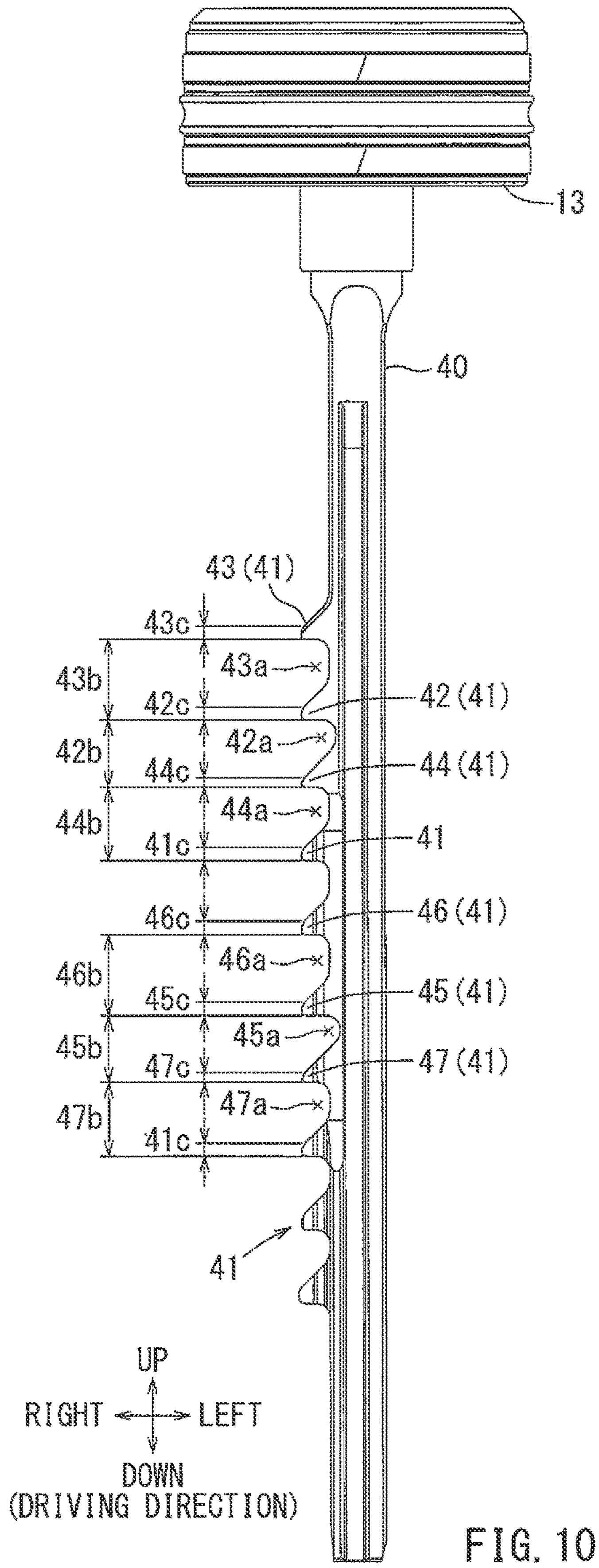
FIG. 10 is a side view of the piston and the driver.

As shown in FIG. 10, the plurality of rack teeth 41 are provided to have substantially the same length, as measured from the axis of the driver 40 to the right end (tip end). The second rack tooth 42 from the side of the plurality of rack teeth 41 in the counter-driving direction (upper side) is referred to as the center rack tooth 42 in the present disclosure. The rack tooth adjacent the center rack 42 in the counter-driving direction, i.e., the uppermost of the plurality of rack teeth 41, is referred to as the upstream rack tooth 43 in the present disclosure. The rack tooth adjacent the center rack tooth 42 in the driving direction, i.e. the third rack of the plurality of teeth 41 from the upper side, is referred to as the downstream rack tooth 44 in the present disclosure. A first tooth groove 43*a* is formed between the center rack tooth 42 and the upstream rack tooth 43. A deep tooth groove 42*a* deeper than the first tooth groove 43*a* is defined between the center rack tooth 42 and the downstream rack tooth 44. A third tooth groove 44*a* having substantially the same depth as the first tooth groove 43*a* is defined on the side of the downstream rack tooth 44 in the driving direction.

As shown in FIG. 10, the sixth rack tooth from the upper side is referred to as the center rack tooth 45 in the present disclosure. The rack tooth adjacent the center rack tooth 45 in the counter-driving direction, i.e., the fifth of the plurality of rack teeth 41 from the upper side, is referred to as the upstream rack tooth 46 in the present disclosure. The rack tooth adjacent the center rack tooth 45 in the driving direction, i.e. the seventh of the plurality of rack teeth 41 from the upper side, is referred to as the downstream rack tooth 47 in the present disclosure. A fifth tooth groove 46*a* having substantially the same depth as the first tooth groove 43*a* is defined between the center rack tooth 45 and the upstream rack tooth 46. A deep tooth groove 45*a* deeper than the fifth tooth groove 46*a* and having substantially the same depth as the other deep tooth groove 42*a* is defined between the center rack tooth 45 and the downstream rack tooth 47. A seventh tooth groove 47*a* having substantially the same depth as the fifth tooth groove 46*a* is defined on the side of the downstream rack tooth 47 in the driving direction. In some embodiments, both of the deep tooth grooves 42*a*, 45*a* are formed deeper than all of the other tooth grooves.

As shown in FIG. 10, a first pitch 43*b*, which is a distance between the center rack tooth 42 and the upstream rack tooth 43, is greater than a second pitch 42*b* between the center rack tooth 42 and the downstream rack tooth 44. The first pitch 43*b* is also greater than a third pitch 44*b* between the downstream rack tooth 44 and the fourth rack tooth 49 from the upper side. The second pitch 42*b* is smaller than the third pitch 44*b*. A fifth pitch 46*b*, which is a distance between the center rack tooth 45 and the upstream rack tooth 46, is substantially the same in size as the first pitch 43*b*. A sixth pitch 45*b* between the center rack tooth 45 and the downstream rack tooth 47 is substantially the same in size as the second pitch 42*b*. A seventh pitch 47*b* between the downstream rack tooth 47 and the eighth rack tooth 48 from the upper side is the same in size as the third pitch 44*b*. The other pitches between each of other of the plurality of rack teeth 41 may be about the same in size as the third pitch 44*b*.

As shown in FIG. 10, a center tooth thickness 42*c* of the center rack tooth 42 and an upstream tooth thickness 43*c* of the upstream rack tooth 43 have substantially the same thickness. A downstream tooth thickness 44*c* of the downstream rack tooth 44 is smaller than the center tooth thickness 42*c*. The center tooth thicknesses 45*c* of the center rack tooth 45 and the upstream tooth thickness 46*c* of the upstream rack tooth 46 have substantially the same thickness as the other center tooth thickness 42*c*. A downstream tooth thickness 47*c* of the downstream rack tooth 47 has substantially the same thickness as the other downstream tooth thickness 44*c*. The other tooth thickness 41*c* of each of the other rack teeth of the plurality of rack teeth 41 have substantially the same thickness as the center tooth thickness 42*c*. In some embodiments, the downstream rack teeth 44, 47 are formed to have downstream tooth thicknesses 44*c*, 47*c* smaller than all of the other rack teeth of the plurality of rack teeth 41. The rack teeth of the plurality of rack teeth 41 other than the center rack teeth 42, 45, the upstream rack teeth 43, 46, and the downstream rack teeth 44, 47 may be formed to have the same shape and arranged at equal pitches.

Hereinafter, an embodiment of a sequence of a driving operation of the driving tool 1 will be described. FIG. 3 shows an embodiment of the piston 13 and the driver 40 in a standby state. When the driver 40 and the piston 13 are in the standby state, they are held stationary at a standby position, which is slightly below an upward movement end. In this standby position, the engaging portion 25 immediately before the relief section 22*d* (in a rotation direction of the wheel 22) engages the bottom portion of the first (lowermost end) rack tooth of the plurality of rack teeth 41, counted from the side in the driving direction.

From the standby state, the electric motor 31 is started when the contact arm 3 shown in FIG. 1 moves upward and the trigger 5 is pulled. The wheel 22 shown in FIG. 3 is rotated in the rotation direction indicated by an arrow R when the electric motor 31 is started. The engaging portion 25 immediately before the relief section 22*d* causes the rack tooth of the plurality of rack teeth 41 at the lowermost end to move upward. This causes the piston 13 and the driver 40 to move upward from the standby position toward the upward movement end. As the driver 40 is shifted to the upward movement end, a rack teeth N (see FIG. 1) is fed into the driving channel 2*a* from the magazine 8. When the driving tool 1 reaches a state immediately before driving, the engaging portions 25 of the wheel 22 disengage from the bottom portion(s) of the plurality of rack teeth 41. This causes the piston 13 and the driver 40 to move downward due to the gas pressure within the pressure accumulation chamber 14. The driver 40 strikes the one fastener N as it moves downward within the driving channel 2*a*.

As the driver 40 moves downward, all the engaging portions 25 of the wheel 22 are to have exited from being within the driving channel 2*a* and to be positioned within the mechanism case 29. Therefore, the relief section 22*d* of the wheel 22 is positioned within the driving channel 2*a*. This avoids the engaging portions 25 from interfering with the plurality of rack teeth 41 of the driver 40 as the driver 40 moves downward, resulting in a smooth driving operation.

Even after the fastener N has been struck, the wheel 22 continues to rotate in the direction indicated by the arrow R. The wheel 22 also continues to rotate after the driver has reached a downward movement end. As shown in FIG. 6, the first engaging portion 25*a* engages with the bottom portion of the upstream rack tooth 43, which is at the uppermost end among the plurality of rack teeth 41. This initiates a return motion to move the piston 13 and the driver 40 upward in the counter-driving direction. When the return motion starts, the wheel 22 is biased toward the driver 40, which is the initial position of the wheel 22, via the compression spring 24. Therefore, the center 22*c* of the wheel 22 is located on the rotation axis 21*c* of the shaft member 21.

Figure 7:
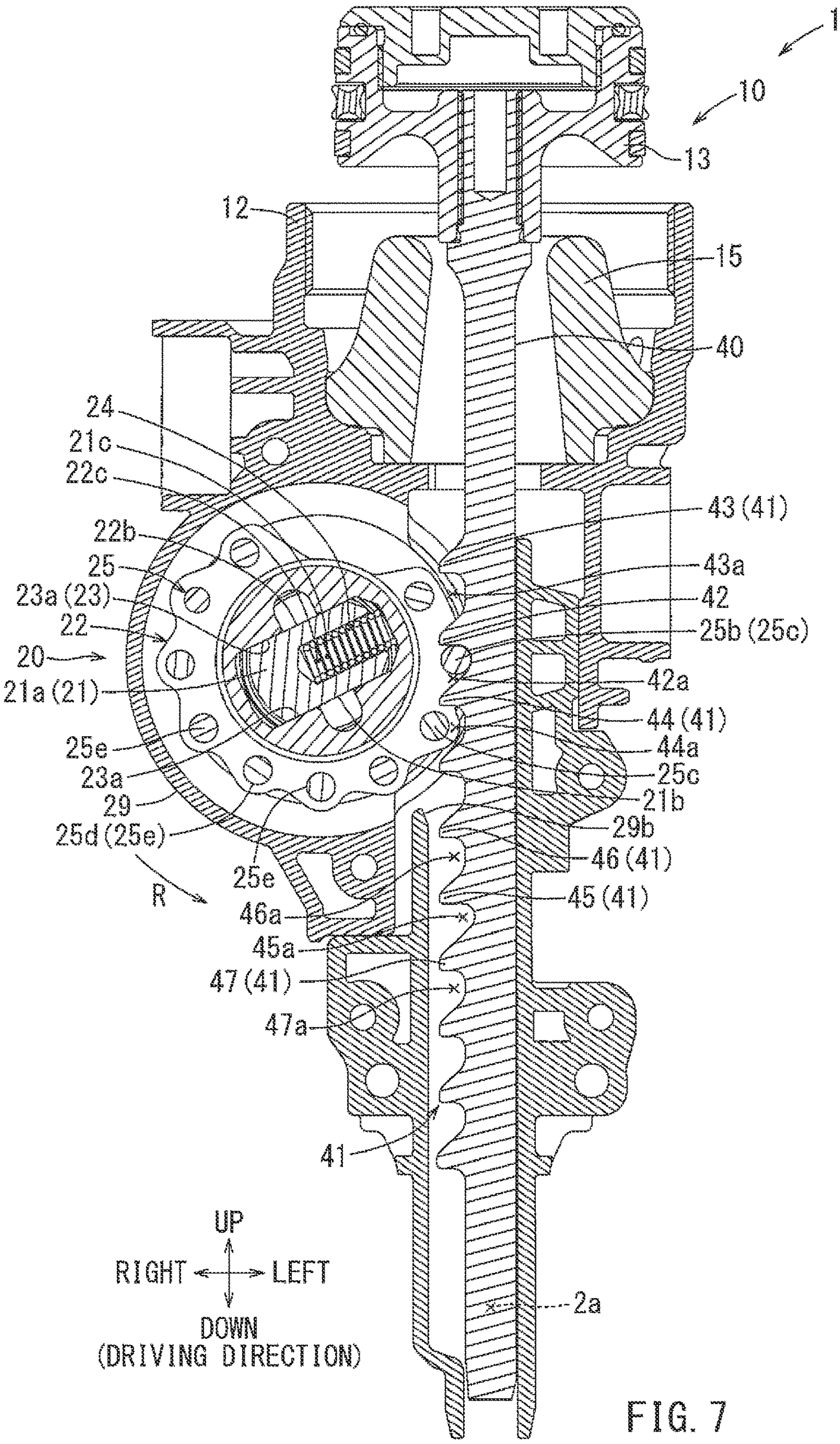
FIG. 7 is a cross-sectional view of the lift mechanism and the driver. This figure illustrates a state in which the wheel is positioned between the initial position and a shifted position, and the second engaging portion is engaged with the second engaged portion.
Figure 8:
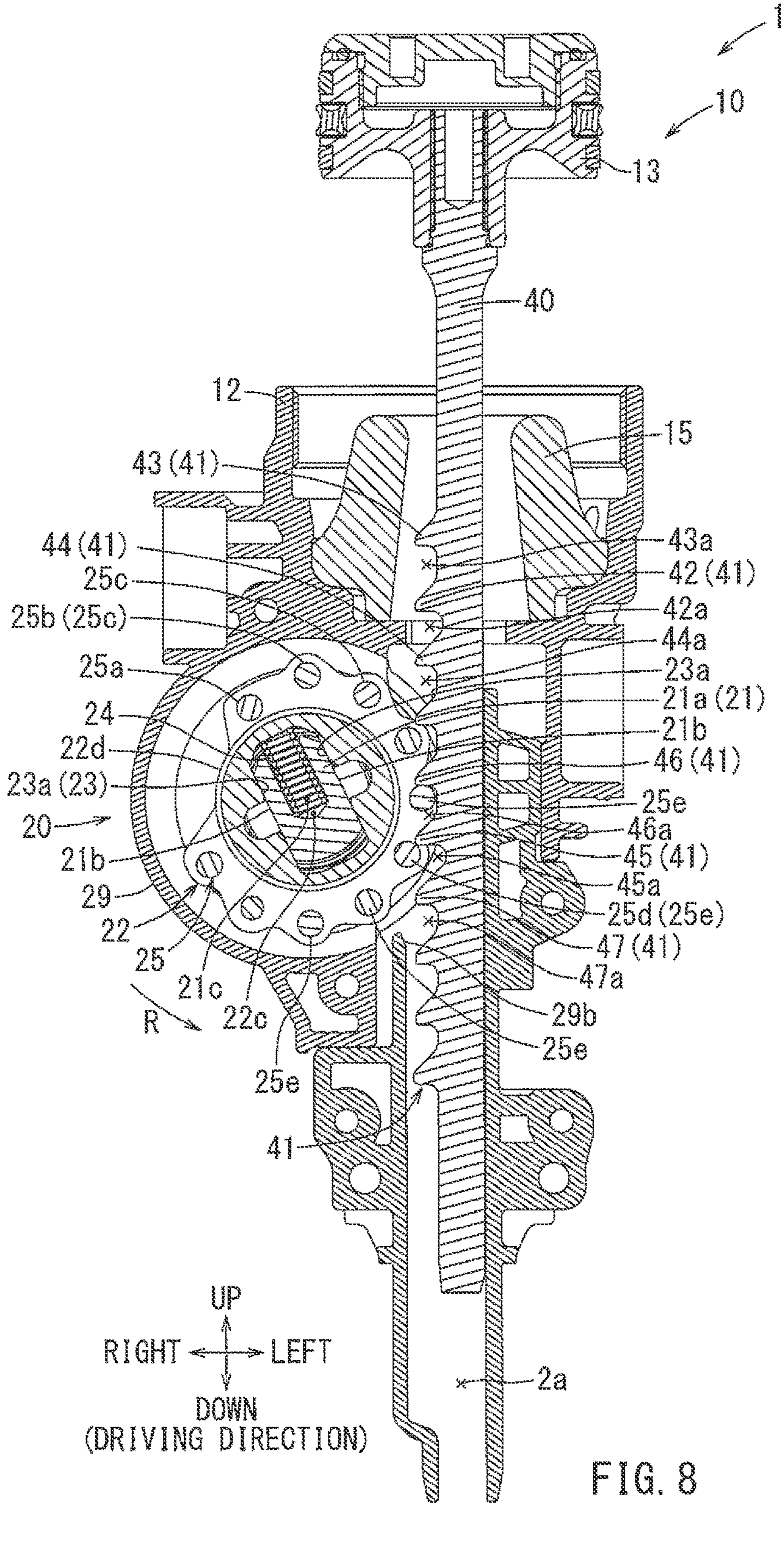
FIG. 8 is a cross-sectional view of the lift mechanism and the driver. This figure illustrates a state in which the wheel is positioned at a shifted position, and a sixth engaging portion is engaged with a bottom portion of a sixth engaged portion.

As shown in FIGS. 6 and 7, the second engaging portion 25*b* engages the bottom portion of the center rack tooth 42. In this embodiment, the second engaging portion 25*b* is an externally positioned engaging portion 25*c* having a farther distance from the center 22*c* than the first engaging portion 25*a*. The second engaging portion 25*c* is configured to come in contact with the groove bottom of the deep tooth groove 42*a*, which is deeper than the other tooth grooves, such as the first and third tooth grooves 43*a*, 44*a*, while the wheel 22 is positioned at the initial position. The downstream rack tooth 44 is provided to have a thinner downstream tooth thickness 44*c* (see FIG. 10), so as not to interfere with the second engaging portion 25*b* when the second engaging portion enters the groove bottom of the deep tooth groove 42*c*. As the wheel 22 continues to rotate in the direction indicated by the arrow R while still being at the initial position, the second engaging portion 25*b* and the bottom portion of the center rack tooth 42 may interfere with each other. The wheel 22 is shifted, for example toward the right, from the initial position to the shifted position against the biasing force of the compression spring 24. This helps avoid interference between the second engaging portion 25*b* and the bottom portion of the center rack tooth 42. For example, the wheel 22 may be shifted to the shifted position, when the slide surface 23*a* is inclined in the counter-driving direction toward the driver 40. The center 22*c* of the wheel 22 is shifted, for example toward the right side, away the rotation axis 21*c* of the shaft member 21.

As shown in FIG. 7, the wheel 22 is shifted from the initial position to the shifted position when the second engaging portion 25*b* and the bottom portion of the center rack tooth 42 engage each other. At this moment, the wheel 22 shifts downward to the right, which causes it to move away from the driver 40. The engagement relationship between the second engaging portion 25*b* and the bottom portion of the center rack tooth 42 is maintained even while the wheel 22 is shifting, at least in part due to the deep tooth groove 42*a* being deeper.

The first pitch 43*b*, which is the distance between the upstream rack tooth 43 and the center rack tooth 42, is formed wider than the other pitches, such as the second and third pitches 42*b*, 44*b* (see FIG. 10). Therefore, the first engaging portion 25 can retract from the first tooth groove 43*a* without interfering with the upstream rack tooth 43 or the center rack tooth 42 as the wheel 22 is shifted from the initial position to the shifted position while the driver 40 is returning in the driving direction. The second pitch 42*b* between the center rack tooth 42 and the downstream rack tooth 44 is formed narrower than the other pitches, such as the first and third pitches 43*b*, 44*b* (see FIG. 10). Therefore, the externally positioned engaging portion 25*c* after the second engaging portion 25*b* is allowed to enter the third tooth groove 44*a* without interfering with the center rack tooth 42, even though the wheel 22 has been shifted to the shifted position.

Figure 9:
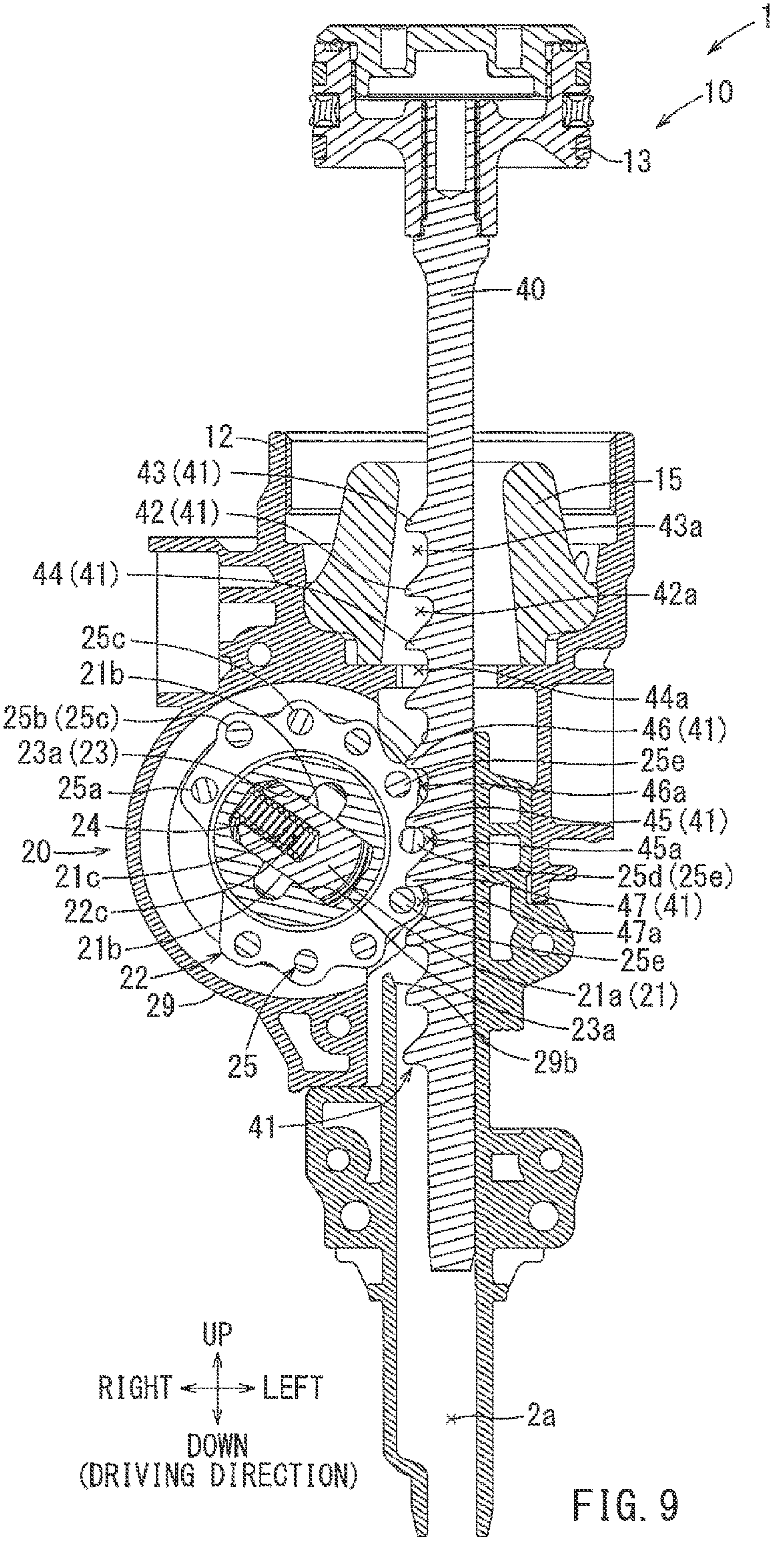
FIG. 9 is a cross-sectional view of the lift mechanism and the driver. This figure illustrates a state in which the wheel is positioned at a position between the initial position and the shifted position.

As shown in FIGS. 9 and 10, the sixth engaging portion 25*d* engages the bottom portion of the center rack tooth 45. The sixth engaging portion 25*d* is an internally positioned engaging portion 25*e* having a closer distance from the center 22*c* of the wheel 22 than the first engaging portion 25*a*. The sixth engaging portion 25*d* engages the bottom portion of the center rack tooth 45 at a position shallower than the groove bottom of the deep tooth groove 45*a* while the wheel 22 is positioned at the shifted position. The downstream rack tooth 47 is formed to have a thinner downstream tooth thickness 47*c* than the other of the plurality of rack teeth 41, so as not to interfere with the sixth engaging portion 25*d* when the sixth engaging portion 25*d* enters into the deep tooth groove 45*a*. When the wheel 22 continues to rotate in the direction indicated by the arrow R, the wheel 22 is shifted to the initial position, for example, when the slide surface 23*a* is inclined toward the driver 40 in the driving direction. The center 22*c* of the wheel 22 then shifts, for example to the right, so as to come closer to the rotation axis 21*c* of the shaft member 21.

As shown in FIG. 7, the wheel 22 is shifted downwardly and to the left, which causes the wheel 22 to come closer to the driver 40 when being shifted from the shifted position to the initial position. The engagement relationship between the sixth engaging portion 25*d* and the bottom portion of the center rack tooth 45 is maintained even while the wheel 22 is shifting, at least in part due to the deep tooth groove 45*a* being deeper.

As shown in FIGS. 8 to 10, a fifth pitch 46*b*, which is a distance between the upstream rack tooth 46 and the enter rack tooth 45, is formed wider than the other pitches. Therefore, the internally positioned engaging portion 25*e* before the sixth engaging portion 25*d* may be retracted from the deep tooth groove 45*a* without interfering with the upstream rack tooth 46 or the center rack tooth 45 while the wheel 22 is shifting from the shifted position to the initial position. A sixth pitch 45*b*, which is a distance between the center rack tooth 45 and the downstream rack tooth 47, is formed to be narrower than the other pitches. Therefore, the internally positioned engaging portion 25*e* after the sixth engaging portion 25*d* may enter into the seventh tooth groove 47*a* without interfering with the center rack tooth 45 after the wheel 22 has shifted to the shifted position.

As show in FIG. 3, when the engaging portion 25 immediately before the relief section 22*d* engages the bottom portion of the rack tooth of the plurality of rack teeth 41 at the lowermost end, the piston 13 and the driver 40 may be placed in the above-described standby position. The electric motor 31 may be stopped once the driver 40 and the piston 13 have reached the standby position, for example by properly controlling the time from when the electric motor 31 (see FIG. 2) was started. This completes the series of a driving operation. The standby position of the piston 13 and the driver 40 is set below the upward movement end position. In one driving operation, the driving operation is performed as the driver 40 moves downward due to gas pressure after it has moved once upward from the standby position to the upward movement end position.

As described-above, and as shown in FIGS. 6 and 8, the driving tool 1 includes a piston 13, which moves in the driving direction due to gas pressure. The driving tool 1 includes a driver 40, which is provided at the piston 13 and moves integrally with the piston 13 to strike a fastener N. The driving tool 1 includes a plurality of rack teeth 41 formed at the driver 40 and positioned along the driver 40 in the driving direction. The driving tool 1 includes a wheel 22 having a plurality of engaging portions 25 at the outer circumference of the wheel 22. The plurality of engaging portions 25 are configured to engage the plurality of rack teeth 41. As the wheel 22 rotates, the driver 40 is moved in the counter-driving direction. At least one of the plurality of engaging portions 25 of the wheel 22 is an advancing/retracting engaging portion 25*b*, 25*d*, which is movable relative to the shaft member 21 of the wheel 22. The driver 40 includes a tooth groove between each of mutually adjacent rack teeth of the plurality of rack teeth 41. The tooth groove that is configured to receive the advancing/retracting engaging portions 25*b*, 25*d* is a deep tooth groove 42*a*, 45*a* deeper than the other tooth grooves.

Therefore, the advancing/retracting engaging portions 25*b*, 25*d* enter the deep tool grooves 42*a*, 45*a* to engage the bottom portion of the corresponding rack tooth of the plurality of rack teeth 41. This allows the advancing/retracting engaging portions 25*b*, 25*d* to engage the bottom portion of the rack the corresponding rack tooth in a position deeper than the other engaging portions 25. This also allows the advancing/engaging portions 25*b*, 25*d* to move with respect to the shaft member 21 of the wheel 22 while keeping engagement with the bottom portion of the corresponding rack tooth of the plurality of rack teeth 41. It is thus possible to suppress strong interference, such as a collision, with the bottom portion of the rack teeth 41 while the advancing/retracting engaging portion 25*b*, 25*d* is moving. This prevents damage to the plurality of rack teeth 41 due to contact with the advancing/retracting engaging portion 25*b*, 25*d*, and enhances the durability and/or longevity of the rack teeth 41.

As shown in FIGS. 7 and 9, the plurality of rack teeth 41 include center rack teeth 42, 45 adjacent the deep tooth grooves 42*a*, 45*a* in the counter-driving direction. The plurality of rack teeth also include upstream rack teeth 43, 46 adjacent the center rack teeth 42, 45 in the counter-driving direction. The first and fifth pitches 43*b*, 46*b* between the center rack teeth 42, 45 and the upstream rack teeth 43, 46 are wider than the pitches between the other mutually adjacent rack teeth of the plurality of rack teeth 41. Therefore, when the advancing/retracting engaging portions 25*b*, 25*d* move with respect to the shaft member 21 of the wheel 22, the driver 40 slightly returns in the driving direction by a movement amount of the advancing/retracting engaging portions 25*b*, 25*d*. Because of this, the engaging portions 25 engaged with the bottom portions of the upstream rack teeth 43, 46 may more easily exit the first and fifth tooth grooves 43*a*, 46*a* without interfering with the center rack teeth 43, 46 or the upstream rack teeth 43, 46. The facilitated exit of the engaging portions 25 is due in part to the wider distances of the first and fifth pitches 43*b*, 46*b* between the center rack teeth 42, 45 and the upstream rack teeth 43, 46. As a result, the upstream rack teeth 43, 46 and the center rack teeth 42, 45 are prevented from being damaged.

As shown in FIGS. 7 and 9, the plurality of rack teeth 41 include downstream rack teeth 44, 47 adjacent to the center rack teeth 42, 45 in a driving direction. Second and fifth pitches 42*b*, 45*b* between the center rack teeth 42, 45 and the downstream rack teeth 44, 47 are narrower than the pitches between other mutually adjacent rack teeth of the plurality of rack teeth 41. Therefore, after the advancing/retracting engaging portions 25*b*, 25*d* have shifted with respect to the rotation axis 21*c* of the wheel 22, the engaging portions 25 may more smoothly move toward the bottom portion of the downstream rack teeth 44, 47 without interfering with the downstream rack teeth 44, 47. As a result, the downstream rack teeth 44, 47 are prevented from being damaged.

As shown in FIGS. 6 and 8, the downstream rack teeth 44, 47 have thinner downstream tooth thicknesses 44*c*, 47*c* than center tooth thicknesses 42*c*, 45*c* of the center rack teeth 42, 45 and than the upstream tooth thicknesses 43*c*, 46*c* of the upstream rack teeth 43, 46. Therefore, when the advancing/retracting engaging portions 25*b*, 25*d* enter the deep tooth grooves 42*a*, 45*a*, it is possible to prevent the advancing/retracting engaging portions 25*b*, 25*d* from interfering with the downstream rack teeth 44, 47. As a result, the downstream rack teeth 44, 47 are prevented from being damaged.

As shown in FIGS. 6 and 7, the driving tool 1 includes a shaft member 21 rotatably attached to a tool body 10. The wheel 22 is radially and slidably attached to the shaft member 21. The wheel 22 rotates with the shaft member 21 about the shaft member 21, and all of the plurality of engaging portions 25 radially move relative to the shaft member 21. Therefore, the advancing/retracting engaging portions 25*b*, 25*d* move integrally with the other engaging portions 25 and with the wheel 22 with respect to the shaft member 21. It is thus possible to prevent the advancing/retracting engaging portions 25*b*, 25*d*, when engaged with the bottom portion of corresponding rack tooth of the plurality of rack teeth 41, from unintentionally moving alone. This may prevent unintentional disengagement of the advancing/retracting engaging portions 25*b*, 25*d* from the bottom portion of the plurality of rack teeth 41.

As shown in FIGS. 6 to 9, the advancing/retracting engaging portions 25*b*, 25*d* enter the deep tooth grooves 42*a*, 45*a* and are pressed against the groove bottom of the deep tooth grooves 42*a*, 45*a*. This causes the advancing/retracting engaging portions 25*b*, 25*d* to move with respect to the rotation axis 21*c* of the wheel 22. Therefore, while the advancing/retracting engaging portions 25*b*, 25*d* are moving, the advancing/retracting engaging portions 25*b*, 25*d* continuously engage the bottom portions of the corresponding rack teeth of the plurality of rack teeth 41. It is thus possible to prevent the advancing/retracting engaging portions 25*b*, 25*d* from suddenly being separated from the bottom portions of the corresponding rack teeth of the plurality of rack teeth 41. As a result, it is possible to prevent collision between the advancing/retracting engaging portions 25*b*, 25*d* and the bottom portions of the corresponding rack teeth of the plurality of rack teeth 41, thereby preventing damage of the plurality of rack teeth 41.

As shown in FIGS. 6 to 9, the advancing/retracting engaging portions 25*b*, 25*d* receive a force in the driving direction from the groove bottoms of the deep tooth grooves 42*a*, 45*a*. The advancing/retracting engaging portions 25*b*, 25*d* may also move in the driving direction. Therefore, while the advancing/retracting engaging portions 25*b*, 25*d* are moving, the load in the counter-driving direction applied from the advancing/retracting engaging portions 25*b*, 25*d* to the bottom portions of the corresponding rack teeth of the plurality of rack teeth 41 can be minimized. This enhances the durability of the plurality of rack teeth 41 that are to be engaged by the advancing/retracting engaging portions 25*b*, 25*d*.

As shown in FIGS. 5 and 6, the wheel 22 slides between the initial position where the advancing/retracting engaging portions 25*b*, 25*d* are separated from the shaft member 21 and the shifted position where one of the advancing/retracting engaging portions 25*b*, 25*d* has approached closer to the shaft member 21. One of the plurality of the engaging portions 25 is a first engaging portion 25*a*, which is configured to first engage the driver 40 when the driver 40 is moved in the counter-driving direction. The plurality of the engaging portions 25 includes an externally positioned engaging portion 25*c* having a center positioned outside a reference circle C centered on an axis of the rotation shaft 21*c* passing through the center of the first engaging portion 25*a* when the wheel 22 is positioned at the initial position. The plurality of engaging portions 25 also includes an internally positioned engaging portion 25*c* that is positioned inside the reference circle C.

Therefore, while the wheel 22 rotates, there is a timing at which the wheel 22 is positioned at the initial position, a timing at which the wheel 22 shifts from the initial position to the shifted position, a timing at which the wheel 22 is positioned at the shifted position, and a timing at which the wheel 22 shifts from the shifted position to the initial position. At any of these timings, an externally positioned engaging portion 25*c* or an internally positioned engaging portion 25*e* may be provided to allow at least one engaging portion 25 to engage a bottom portion of a rack tooth of the plurality of rack teeth 41. This ensures a stabilized returning motion of the driver 40 due to rotation of the wheel 22.

As shown in FIGS. 5 and 6, the plurality of engaging portions 25 may be disposed at the wheel 22 so as to come in contact with the plurality of rack teeth 41 at equal angular intervals while the wheel 22 is rotating. Therefore, it is possible to return the driver 40 to a stand-by position at a substantially constant speed by rotating the wheel 22 at a substantially constant speed. This allows the engaging portions 25 to engage the bottom portions of the plurality of rack teeth 41 without providing, for example, a speed adjusting mechanism for adjusting the rotation speed of the wheel 22. As a result, a mechanism for rotating the wheel 22 can be made more compact.

As shown in FIGS. 6 and 9, the plurality of engaging portions 25 include a first engaging portion 25*a*, which first engages with the driver 40 when the driver 40 is moved in the counter-driving direction, and a second engaging portion 25*b*, which engages with the driver 40 after the first engaging portion 25*a*. The advancing/retracting engaging portion 25*b* may be the second engaging portion 25*b*. Therefore, when the driver 40 stops at an irregular position due to, for example, nail jamming or insufficient driving depth, the engaging portion 25 that first interferes with the plurality of rack teeth 41 can still be the first engaging portion 25*a*. The other engaging portions 25 after the second engaging portion 25*b* allows the driver 40 to move in the counter-driving direction without interfering with the plurality of rack teeth 41 by eliminating the interference between the first engaging portion 25*a* and the plurality of rack teeth 41. By adopting a structure to move the wheel 22 from the initial position to the shifted position at the timing when the second engaging portion 25*b* engages the bottom portion of the corresponding rack tooth of the plurality of rack teeth 41, the first engaging portion 25*a* may be smoothly retracted from the first tooth groove 43*a* between the upstream rack tooth 43 and the center rack tooth 42 without the first engaging portion 25*a* interfering with the upstream rack tooth 43. Thus, the returning motion of the driver 40 can be continued well.

Hereinafter, a second embodiment will be described with reference to FIGS. 11 to 18. A driving tool 50 of the second embodiment includes a lift mechanism 51 and a driver 60, instead of the lift mechanism 20 and the driver 40 shown in FIG. 6. In the following description, only the parts that are substantially different from the first embodiment will be described in detail.

Figure 11:
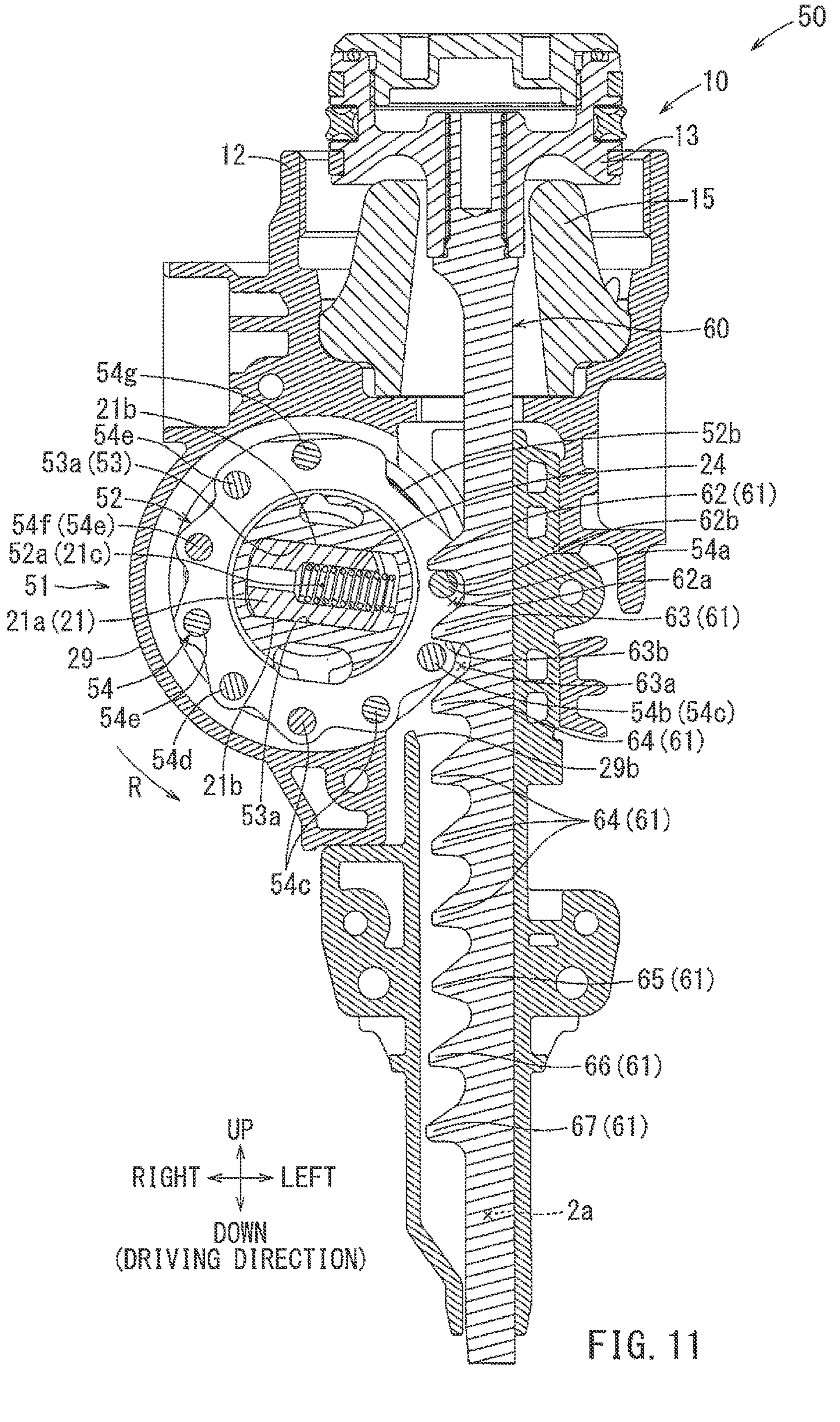
FIG. 11 is a cross-sectional view of a lift mechanism and a driver. This figure illustrates a state in which a wheel is positioned at an initial position, and a first engaging portion is engaged with an engaged surface of a pre-advanced rack tooth.

As shown in FIG. 11, a vertically elongated driver 60 is coupled to a lower side of the piston 13. A lower part of the driver 60 is configured to enter into the driving channel 2*a*. The driver 60 moves downward within the driving channel 2*a* due to gas pressure within the pressure accumulation chamber 14 acting against an upper side of the piston 13 (see FIG. 3). A lower end of the driver 60 is configured to strike one fastener N fed into the driving channel 2*a*. A plurality of rack teeth 61 are provided on a right side of the driver 60. In the present embodiment, nine rack teeth 61 are aligned in an up/down direction along a longitudinal direction of the driver 60. Each of the plurality of rack teeth 61 is provided so as to project to the right, with a bottom portion oriented to the side of the driving direction (downward). The bottom portions of the plurality of rack teeth 61 (e.g., the engaged surfaces) are configured to engage the engaging portions 54 provided at the lift mechanism 51.

As shown in FIG. 11, the lift mechanism 51 is accommodated within a substantially cylindrical mechanism case 29 at substantially the same position as the lift mechanism 20 shown in FIG. 3. The lift mechanism 51 includes a shaft member 21 connected to a reduction gear train 32 (see FIG. 2) and a wheel 52 attached to the shaft member 21. When the electric motor 31 is started (see FIG. 2), the shaft member 21 of the lift mechanism 51 and the wheel 52 integrally rotate, in a direction indicated by an arrow R (counterclockwise direction) in FIG. 11. As the wheel rotates 52 in the arrow R direction, the driver 60 is lifted upward after striking a fattener N. The gas pressure within the pressure accumulation chamber 14 (see FIG. 3) is increased as the piston 13, which is integral with the driver 60, returns upward.

Figure 13:
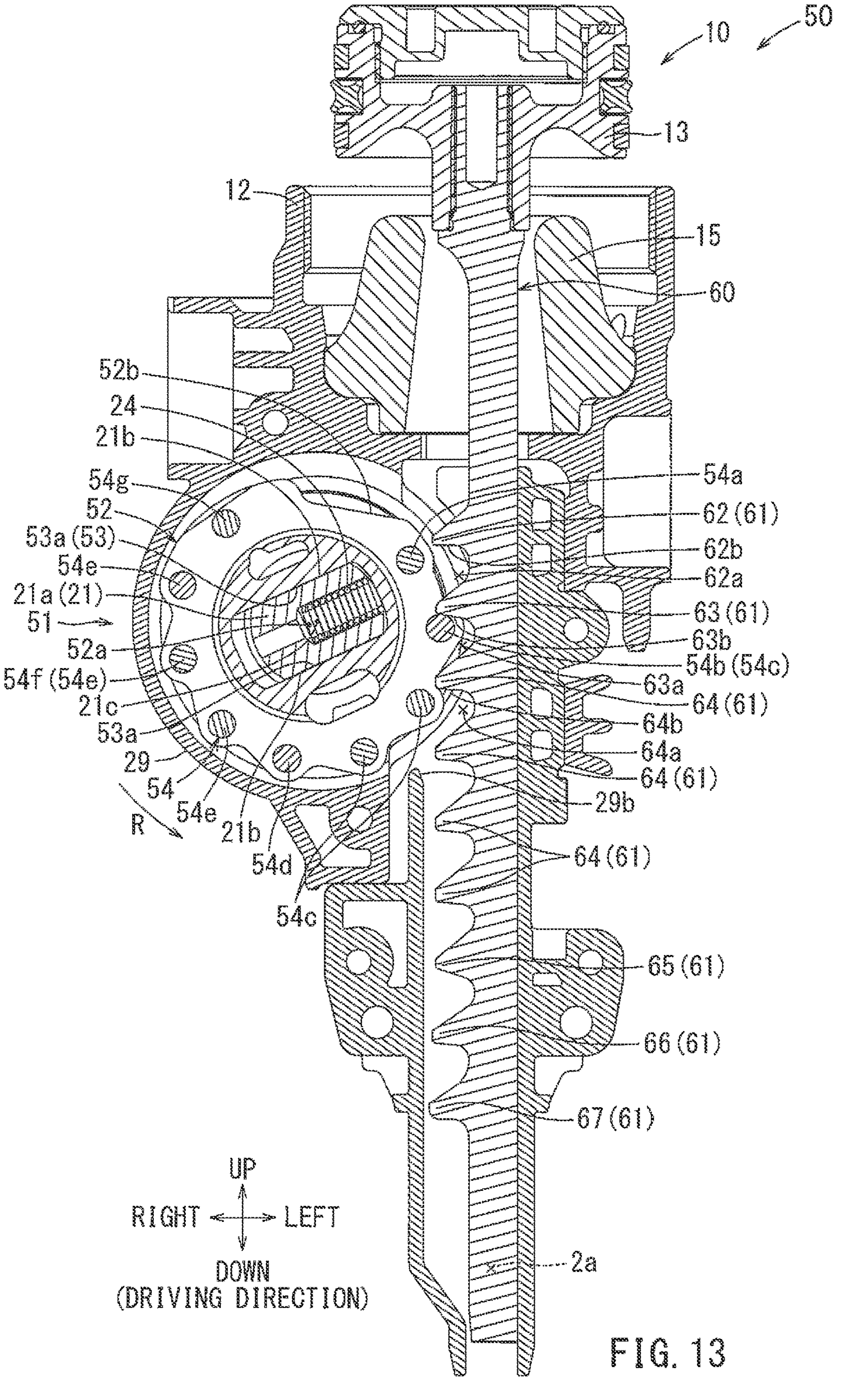
FIG. 13 is a cross-sectional view of the lift mechanism and the driver. This figure illustrates a state in which the wheel is shifted to the shifted position, and the second engaging portion is engaged with the engaged surface of the advancing rack tooth.

As shown in FIG. 11, an attachment hole 53, into which the supporting member 21*a* of the shaft member 21 is to be inserted, is provided at the center of the wheel 22. An inner wall surface of the attachment hole 53 is provided with a pair of slide surfaces 53*a*, which extend radially and in parallel to each other. The distance between the pair of slide surfaces 53*a* is substantially equal to the distance between the pair of supporting planes 21*b* provided to the supporting member 21*a*. As the supporting member 21*a* is inserted into the attachment hole 53, each slide surface 53*a* and each supporting plane 21*b* face and come in contact with each other. The wheel 52 is displaceable within a certain range in a radial direction with respect to the shaft member 21 as the slide surfaces 53*a* slidably contact the supporting planes 21*b*. As shown in FIG. 11, a position of the wheel 52 when the center 52*c* of the wheel 52 is positioned on the rotation axis 21*c* of the shaft member 21 will be referred to as an initial position for purposes of this discussion. As shown in FIG. 13, a position of the wheel 52 when the center 52*c* of the wheel 52 is most off-centered from the rotation axis 21*c* of the shaft member 21 will be referred to as a shifted position for purposes of this discussion.

As shown in FIG. 11, the wheel 52 is biased with respect to the supporting member 21*a* in a direction from the shifted position toward the initial position by a compression spring 24. Therefore, when an external force is not acting on the wheel 52, the wheel 52 is retained in the initial position. When an external force in excess of a certain level (e.g., more than the spring force of the compression spring 24) in a direction toward the shifted position acts on the wheel 52, the wheel 52 shifts from the initial position to the shifted position against a biasing force of the compression spring 24.

As shown in FIG. 11, a plurality of engaging portions 54 are attached along the outer circumferential edge of the wheel 52. In the present embodiment, for example, nine engaging portions 55 may be provided. A columnar shaft member (e.g., a pin) is used for each of the engaging portions 54 in this embodiment. Each of the engaging portions 54 is rotatably supported by the wheel 52 so that they may rotate about each of their axes. A left part of the wheel 52 enters into the driving channel 2*a* via a window 29*b* provided in the mechanism case 29. At least one of the engaging portions 54 of the wheel 52 engages the bottom portion (engaged surface) of a rack tooth of the plurality of rack teeth 61 of the driver 60 within the driving channel 2*a* as the wheel 52 rotates, in the arrow R direction in FIG. 11.

As shown in FIG. 11, at least some of the plurality of engaging portions 54 have different distances from the center 52*a* of the wheel 52. Further, circumferential intervals between two adjacent engaging portions 54 may be different, thereby resulting in different circumferential angles (e.g., arc angles) with respect to the center 52*a*. In the present embodiment, nine engaging portions 25 are disposed at predetermined intervals in an area over about three-quarters of the circumference of the wheel 52. An area over about one-quarter of the wheel 52 is provided as a relief section 52*b*, where no engaging portions 54 are provided.

As shown in FIG. 11, the engaging portion 54 immediately after the relief section 52*b* in a rotation direction of the wheel 52 will be referred to as a first engaging portion 54*a*. The engaging portion 54 arranged immediately after the first engaging portion 54*a* in the rotation direction of the wheel 52 will be referred to as a second engaging portion 54*b*. The second engaging portion 54*b* is movable with respect to the rotation axis 21*c* as the wheel 52 slides in the radial direction. The second engaging portion 54*b* will also be referred to as an advancing/retracting engaging portion 54*b* in the present disclosure. The engaging portion 54 arranged at the sixth position after the first engaging portion 54*a* in the rotation direction of the wheel 52 will be referred to as a seventh engaging portion 54*f*. The seventh engaging portion 54*f* is also movable with respect to the rotation axis 21*c* as the wheel 52 slides in the radial direction. The seventh engaging portion 54*f* will also be referred to as an advancing/retracting engaging portion 54*f* in the present disclosure. The three engaging portions 54 arranged between the first engaging portion 54*a* and the fifth engaging portion 54*d* will each be referred to as an externally positioned engaging portion 54*c*. The three engaging portions 54 arranged after the fifth engaging portion 54*d* will each be referred to as an internally positioned engaging portion 54*e*. The engaging portion 54 immediately before the relief section 52*b* in the rotation direction of the wheel 52 will be referred to as a final engaging portion 54*g*. Two adjacent engaging portions 54 form an arc angle with respect to the center 52*c* of the wheel 52. The arc angles are generally smaller if the distance from the center of each of the engaging portions 54 to the center 52*a* of the wheel 52 defining the angle is longer, and larger if the distance is shorter.

Figure 18:
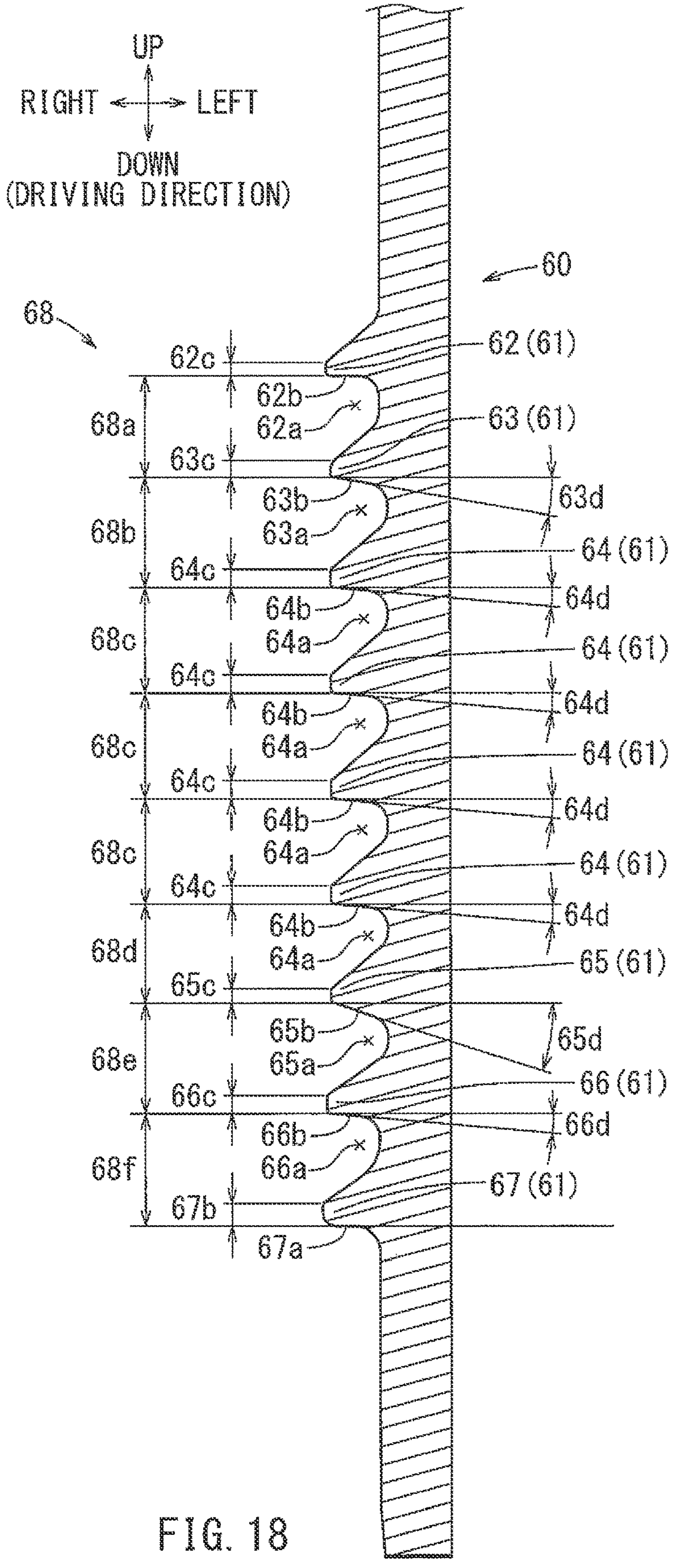
FIG. 18 is a cross-sectional view of an area of the driver provided with the rack teeth.

As shown in FIG. 18, a plurality of rack teeth 61 are provided to have substantially the same length as measured from the axis of the driver 60 to the right end (tip end). The second rack tooth of the plurality of rack teeth 61 from the side of the counter-driving direction (upper side) is referred to as an advancing rack tooth 63 in the present disclosure. The seventh rack tooth of the plurality of rack teeth 61 from the side of the counter-driving direction is referred to as a returning rack tooth 65 in the present disclosure. The ninth rack tooth of the plurality of rack teeth 61 from the upper side, the rack tooth provided at the lowermost end, is referred to as a last rack tooth 67. The last rack tooth 67 may be provided to have a length as measured from the axis of the driver 60 to the right end, for example, 1 mm longer in length than the other rack teeth 61.

As shown in FIG. 18, the one or more of the plurality of rack teeth 61 provided on the side of the advancing rack tooth 63 in the counter-driving direction, i.e. the top rack tooth of the plurality of rack teeth 61, is referred to as a pre-advanced rack tooth 62 in the present disclosure. The third to sixth rack teeth of the plurality of rack teeth 61 from the upper side, which are provided between the advancing rack tooth 63 and the returning rack tooth 65, are referred to as post-advanced rack teeth 64 in the present disclosure. The eighth rack tooth of the plurality of rack teeth 61 from the upper side, which is positioned between the returning rack tooth 65 and the last rack tooth 67, is referred to as a post-returned rack tooth 66 in the present disclosure.

As shown in FIG. 18, a first shallow tooth groove 62*a* is defined between the pre-advanced rack tooth 62 and the advancing rack tooth 63. A first deep tooth groove 63*a*, that is, for example, 1 mm or 2 mm deeper than the first shallow tooth groove 62*a*, is defined on the side of the advancing rack tooth 63 in the driving direction. Another deep tooth groove 64*a* having substantially the same depth as the first deep tooth groove 63*a* is defined on the side of the rack teeth 64 in the driving direction. A second deep tooth groove 65*a* having substantially the same depth as the first deep tooth groove 63*a* is defined on the side of the returning rack tooth 65 in the driving direction. A second shallow tooth groove 66*a* is defined having substantially the same depth as the first shallow tooth groove 62*a*. The second shallow tooth groove 66*a* is defined on the side of the post-returned rack tooth 66 in the driving direction.

As shown in FIG. 18, a pre-advancing engaged surface 62*b* is positioned on a lower side of the pre-advanced rack tooth 62 and extends in a direction orthogonal to the axial direction (up/down direction) of the driver 60. An advancing engaged surface 63*b* is positioned on a lower side of the advancing rack tooth 63 and is inclined downward to the left with respect to an orthogonal plane orthogonal to the axial direction of the driver 60 (in a direction from the tooth tip toward the tooth root of the advancing rack tooth 63). The inclination angle 63*d* of the advancing engaged surface 63*b* with respect to the orthogonal plane orthogonal to the axial direction of the driver 60 may be, for example, within a range of 5° to 15°, and more preferably within 8° to 12°. Post-advanced engaged surfaces 64*b* are each a lower side of the corresponding post-advanced rack tooth 64 and are inclined downward to the left with respect to the orthogonal plane orthogonal to the axial direction of the driver 60 (in a direction from the tooth tip toward the tooth root of the post-advanced rack tooth 64). The inclination angles 64*d* of each post-advanced engaged surface 64*b* with respect to the orthogonal plane orthogonal to the axial direction of the driver 60 is smaller than the inclination angle 63*d* of the advancing engaged surface 63*b* of the advancing rack tooth 63. The inclination angles 64*d* of the post-advanced engaged surfaces 64*b* are, for example, within a range of 3° to 7°.

As shown in FIG. 18, a returning engaged surface 65*b* is a lower side surface of the returning rack tooth 65 and is inclined downward to the left with respect to the orthogonal plane orthogonal to the axial direction of the driver 60 (in a direction from the tooth tip toward the tooth root of the returning rack tooth 65). The inclination angle 65*d* of the returning engaged surface 65*b* with respect to the orthogonal plane orthogonal to the axial direction of the driver 60 is greater than the inclination angle 63*d* of the advancing engaged surface 63*b* of the advancing rack tooth 63. The inclination angle 65*d* of the returning engaged surface 65*b* is also greater than the inclination angles 64*d* of the post-advanced engaged surfaces 64*b* of the post-advanced rack teeth 64. The inclination angle 65*d* of the returning engaged surface 65*b* may be, for example, within a range of 13° to 23°, and more preferably 16° to 20°. A post-returned engaged surface 66*b* is a lower side surface of the post-returned rack tooth 66 and is inclined downward to the left with respect to the orthogonal plane orthogonal to the axial direction of the driver 60. The inclination angle 66*d* of the post-returned engaged surface 66*b* with respect to the orthogonal plane orthogonal to the axial direction of the driver 60 is smaller than the inclination angle 65*d* of the returning engaged surface 65*b*. The inclination angle 66*d* of the post-returned engaged surface 66*b*, for example, is substantially the same as the inclination angle 64*d* of the post-advanced engaged surface 64*b* of the post-advanced rack tooth 64. A last engaged surface 67*a* is a lower side surface of the last rack tooth 67 and extends in the direction orthogonal to the axial direction of the driver 60 (up/down direction).

As shown in FIG. 18, a tooth thickness of each rack tooth of the plurality of the rack teeth 61 in the up/down direction tends to be thinner as the inclination angle of corresponding the engaged surface becomes greater, and is thicker as the inclination angle of the corresponding engaged surface becomes smaller. That is, an advancing tooth thickness 63*c* of the advancing rack tooth 63 is provided to be thinner than a post-advanced tooth thickness 64*c* of the post-advanced rack tooth 64. A returning tooth thickness 65*c* of the returning rack tooth 65 is provided to be thinner than the advancing tooth thickness 63*c* of the advancing rack tooth 63 and the post-advanced tooth thickness 64*c* of the post-advanced rack tooth 64. A post-returned tooth thickness 66*c* of the post-returned rack tooth 66 is provided to have substantially the same thickness as the post-advanced tooth thickness 64*c* of the post-advanced rack tooth 64. Since the pre-advanced rack tooth 62 engages the engaging portion 54 while the gas pressure within the accumulation chamber 14 is still low (see FIG. 1), the pre-advanced tooth thickness 62*c* is provided with substantially as thin of a tooth thickness as the advancing tooth thickness 63*c* of the advancing rack tooth 63. Since the last rack tooth 67 retains the driver 60 in the standby position, which is when the gas pressure is sufficiently high, the last tooth thickness 67*b* is provided to be thicker than the toot thicknesses of the other rack teeth of the plurality of rack teeth 61.

As shown in FIG. 18, each pitch 68 of the plurality of rack teeth 61 is provided at an unequal interval. This allows each of the plurality of rack teeth 61 to engage with a corresponding engaging portion 54 of the lift mechanism 51 at substantially the same time intervals, or at a specific time when the wheel 52 rotates to a predetermined rotation angle (see FIG. 11). A second pitch 68*b*, which is a distance between the advancing rack tooth 63 and the post-advanced rack tooth 64, is greater than a first pitch 68*a* between the pre-advanced rack tooth 62 and the advancing rack tooth 63. The second pitch 68*b* is also greater than a third pitch 68*c* between adjacent post-advanced rack teeth 64. A fourth pitch 68*d* between the post-advanced rack tooth 64 and the returning rack tooth 65 is provided to be slightly smaller than the third pitch 68*c* between the post-advanced rack teeth 64. A fifth pitch 68*e* between the returning rack tooth 65 and the post-returned rack tooth 66 is greater than the fourth pitch 68*d* between the post-advanced rack tooth 64 and the returning rack tooth 65, and is as large as the second pitch 68*b* between the advancing rack tooth 63 and the post-advanced rack tooth 64. A sixth pitch 68*f* between the post-returned rack tooth 66 and the last rack tooth 67 is provided to be as large as or slightly larger than the fifth pitch 68*e* between the returning rack tooth 65 and the post-returned rack tooth 66.

Next, an embodiment of the engagement between each of the plurality of rack teeth 61 and each corresponding engaging portions 54 when the driver 60 is moved upward in the counter-driving direction will be described. As shown in FIG. 11, after the driver 60 has reached the downward movement end, the first engaging portion 54*a* engages with the pre-advancing engaged surface 62*b* of the pre-advanced rack tooth 62 as the wheel 52 rotates in the direction indicated by the arrow R. This generally initiates a return motion to move the piston 13 and the driver 60 upward in the counter-driving direction. When the return motion starts, the wheel 52 is biased, via the compression spring 24, generally toward the driver 60 and is positioned at the initial position.

Figure 12:
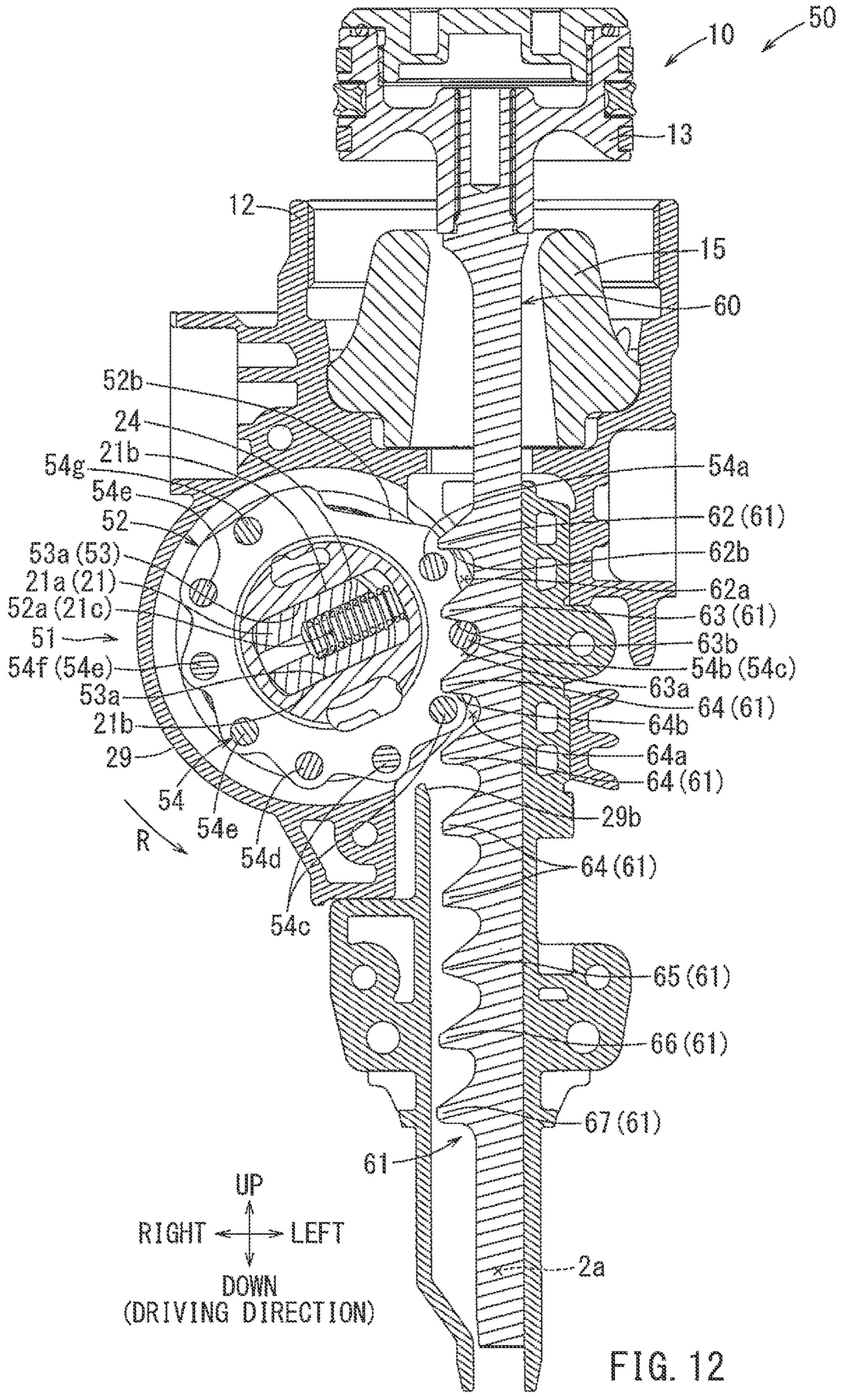
FIG. 12 is a cross-sectional view of the lift mechanism and the driver. This figure illustrates a state in which the wheel is positioned at the initial position, and the second engaging portion is engaged with the engaged surface of an advancing rack tooth.

As shown in FIG. 12, as the wheel 52 further rotates in the direction indicted by the arrow R, the second engaging portion 54*b* engages the advancing engaged surface 63*b* of the advancing rack tooth 63. The advancing engaged surface 63*b* is inclined in a direction toward the driving direction (downward) from the tooth tip to the tooth root of the advancing rack tooth 63. Therefore, the second engaging portion 54*b* and the advancing engaged surface 63*b* engage at an earlier timing than if the advancing engaged surface 63*b* were to be orthogonal to the axial direction of the driver 60. The second engaging portion 54*b* engages the groove bottom of the deep tooth groove 63*a* near the tooth root of the advancing rack tooth 63 at the start of the engagement with the advancing engaged surface 63*b*. When the second engaging portion 54*b* start engaging the advancing engaged surface 63*b*, the wheel 52 is still positioned at the initial position.

As shown in FIG. 13, as the wheel 52 continues to rotate in the direction indicated by the arrow R while still being at the initial position, a force in the driving direction is applied to the second engaging portion 54*b* from the advancing rack tooth 63. This force will generally be greater than the biasing force of the compression spring 24. Therefore, the wheel 52 is shifted from the initial position to the shifted position with respect to the shaft member 21. This occurs as the second engaging portion 54*b* and the advancing engaged surface 63*b* of the advancing rack tooth 63 are engaged. The shift direction from the initial position to the shifted position contains a direction component pointing in a direction moving away from the driver 60 and a driving direction (downward) component pointing in the driving direction. The wheel 52 is shifted in a direction slightly inclined downward and toward the right; in other words, in a direction at a small inclined angle with respect to the orthogonal plane orthogonal to the axial direction of the driver 60. Therefore, the downwardly movement amount of the second engaging portion 54*b* is small while the wheel 52 is shifted from the initial position to the shifted position. This shortens the downwardly returning distance of the driver 60 when the wheel 52 is shifted from the initial position to the shifted position.

Figure 14:
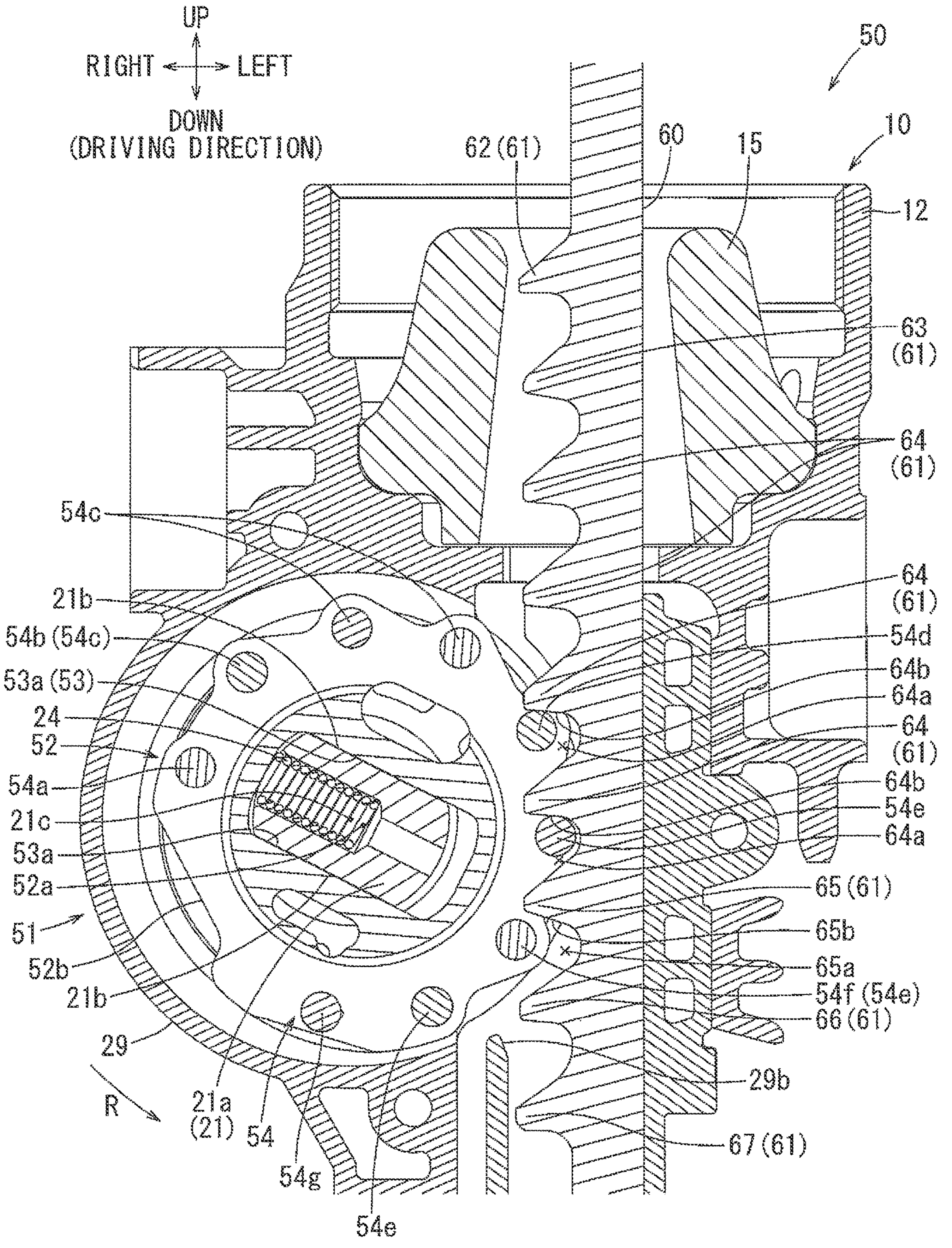
FIG. 14 is a cross-sectional view of the lift mechanism and the driver. This figure illustrates a state in which the wheel is shifted to the shifted position, and an externally positioned engaging portion is engaged with the engaged surface of a post-advanced rack tooth.

As shown in FIG. 14, the engaging portions 54 successively engages the post-advanced engaged surfaces 64*b* of the post-advanced rack teeth 64 when the wheel 52, which is now in the shifted position, further rotates in the direction indicated by the arrow R. The post-advanced engaged surfaces 64*b* are inclined in a direction toward the driving direction (downward) from the tooth tip to the tooth root of the post-advanced rack tooth 64. Therefore, the engaging portions 54 and the post-advanced engaged surfaces 64*b* engage at an earlier timing than would be the case if the post-advanced engaged surface 64*b* were to be orthogonal to the axial direction of the driver 60. The engaging portions 54 thus engage the groove bottom of the deep tooth groove 64*a* near the tooth root of the post-advanced rack tooth 64 at the start of the engagement with the post-advanced engaged surface 64*b*.

Figure 15:
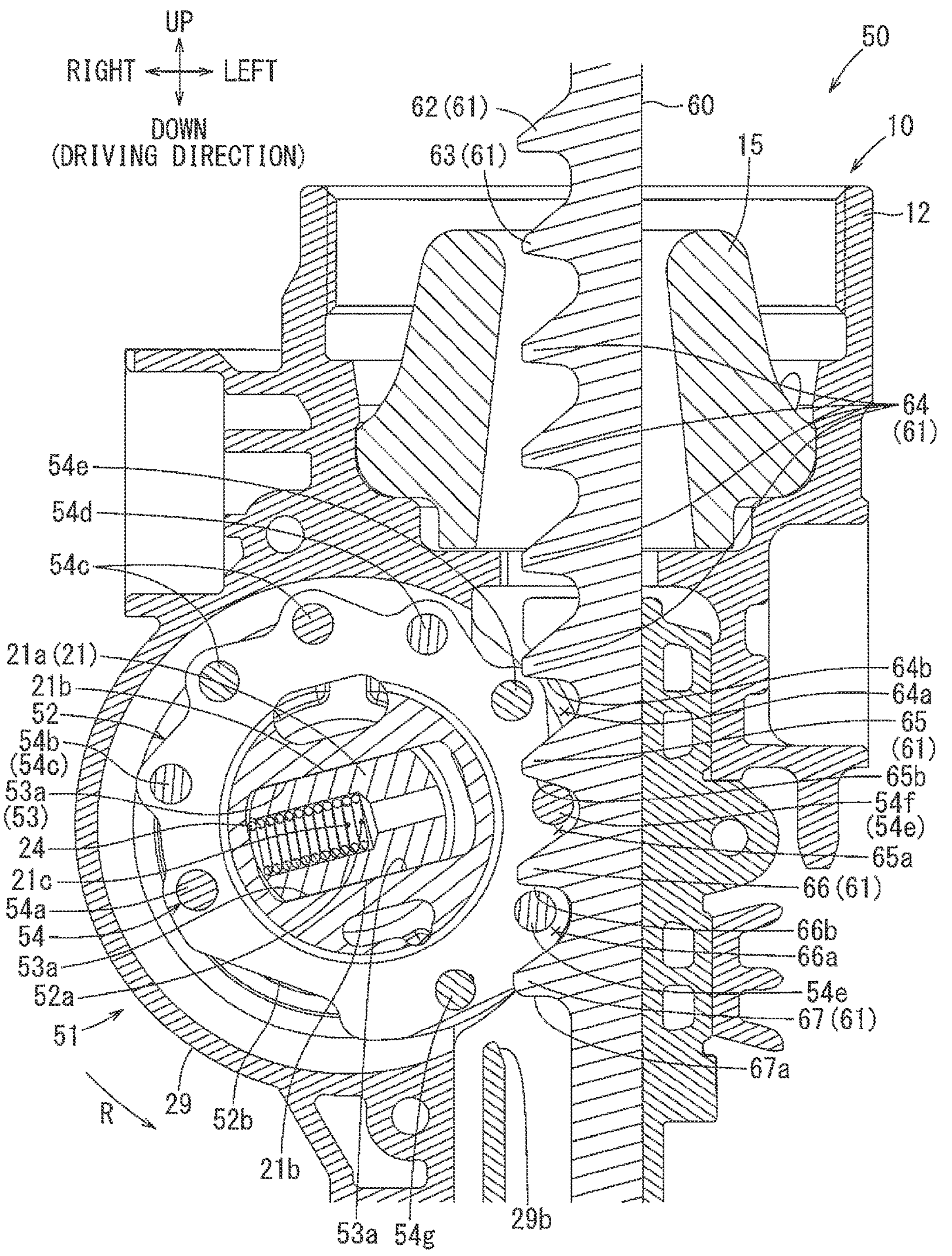
FIG. 15 is a cross-sectional view of the lift mechanism and the driver. This figure illustrates a state in which the wheel is shifted to the shifted position, and a seventh engaging portion is engaged with the engaged surface of the returning rack tooth.

As shown in FIG. 15, as the wheel 52 continues to rotate in the direction indicated by the arrow R, the seventh engaging portion 54*f* engages the returning engaged surface 65*b* of the returning rack tooth 65. The returning engaged surface 65*b* is inclined in a direction toward the driving direction (downward) from the tooth tip to the tooth root of the returning rack tooth 65. Therefore, the seventh engaging portion 54*f* and the returning engaged surface 65*b* engage at an earlier timing than would be the case if the engaged surface 65*b* were to be orthogonal to the axial direction of the driver 60. The seventh engaging portion 54*f* thus engages the groove bottom of the second deep tooth groove 65*a* near the tooth root of the returning rack tooth 65 at the start of engagement with the returning engaged surface 65*b*.

Figure 16:
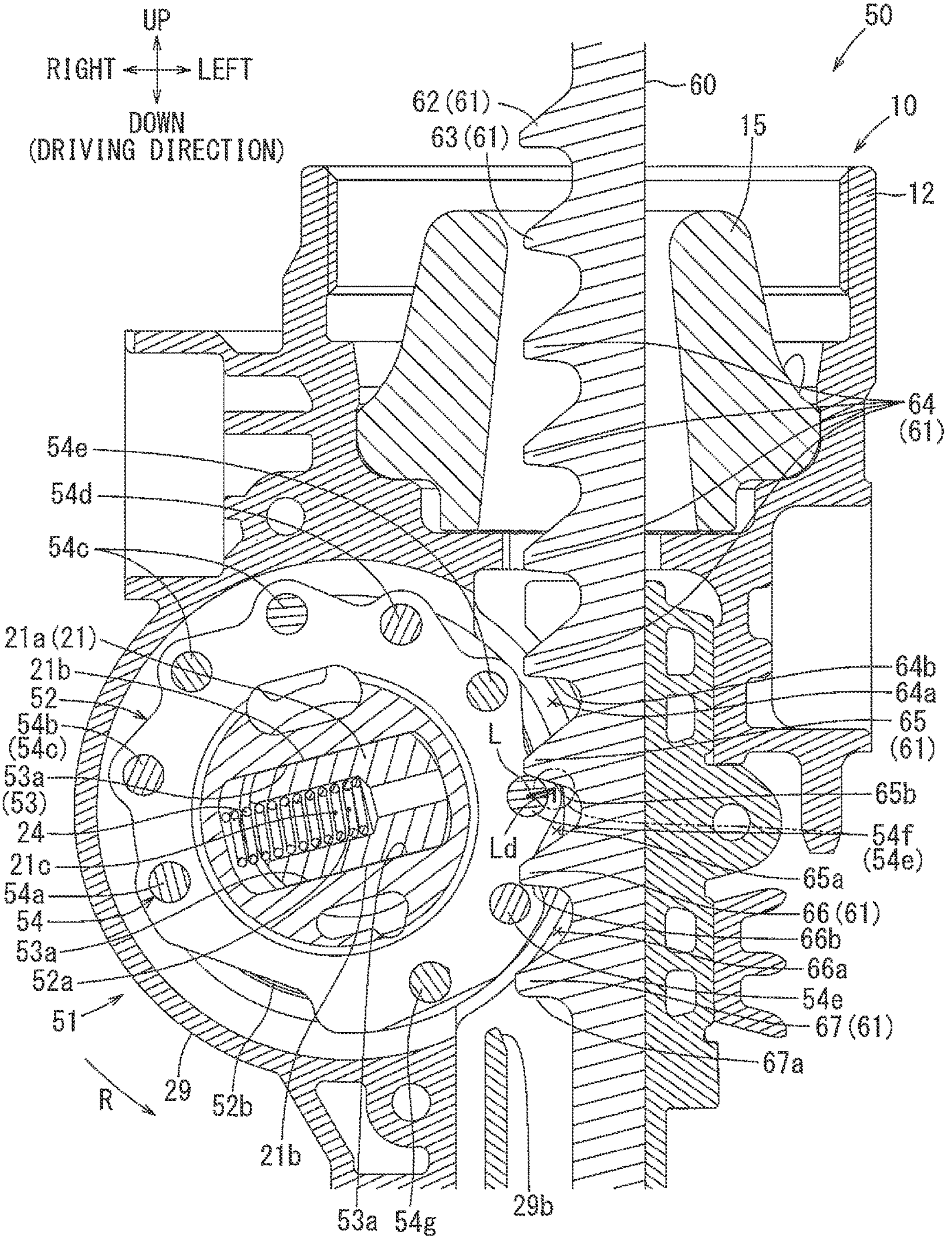
FIG. 16 is a cross-sectional view of the lift mechanism and the driver. This figure illustrates a state in which the wheel is shifted to the initial position, and the seventh engaging portion is engaged with the engaged surface of the returning rack tooth.

As shown in FIG. 16, as the wheel 52 continues to rotate in the direction indicated by the arrow R while still being at the shifted position, a force applied to the seventh engaging portion 54*f* from the returning rack tooth 65 will generally be greater than the frictional force between the slide surface 53*a* of the wheel 52 and a supporting plane 21*b* of the shaft member 21. Therefore, the wheel 52 is shifted from the shifted position to the initial position with respect to the shaft member 21. This shifting occurs while the seventh engaging portion 54*f* and the returning engaged surface 65*b* of the returning rack tooth 65 are still engaged. At this timing, the shaft member 21 has rotate about 180° from the time when the wheel 52 was shifted from the initial position to the shifted position. The shift direction of the wheel 52 from the shifted position to the initial position contains a direction component in a direction moving away from the driver 60 and a driving direction (downward) component in the driving direction. The inclination angle 65*d* of the returning engaged surface 65*b* is greater than the inclination angle 63*d* of the advancing engaged surface 63*b* of the advancing rack tooth 63 and the inclination angle 64*d* of the post-advanced engaged surface 64*b* of the post-advanced rack tooth 64 (see FIG. 18). Therefore, the wheel 52 is allowed to shift in a direction slightly inclined downward toward the right; in other words, in a direction at a small inclined angle with respect to the orthogonal plane orthogonal to the axial direction of the driver 60 while the gas pressure in the accumulation chamber 14 is high as the driver 60 approaches the upward motion end. Thus, a movement amount Ld of the seventh engaging portion 54*f* in the driving direction is small when the wheel 52 is shifted from the shifted position to the initial position. This enables a shortened downwardly returning distance of the driver 60 when the wheel 52 is shifted from the shifted position to the initial position.

Figure 17:
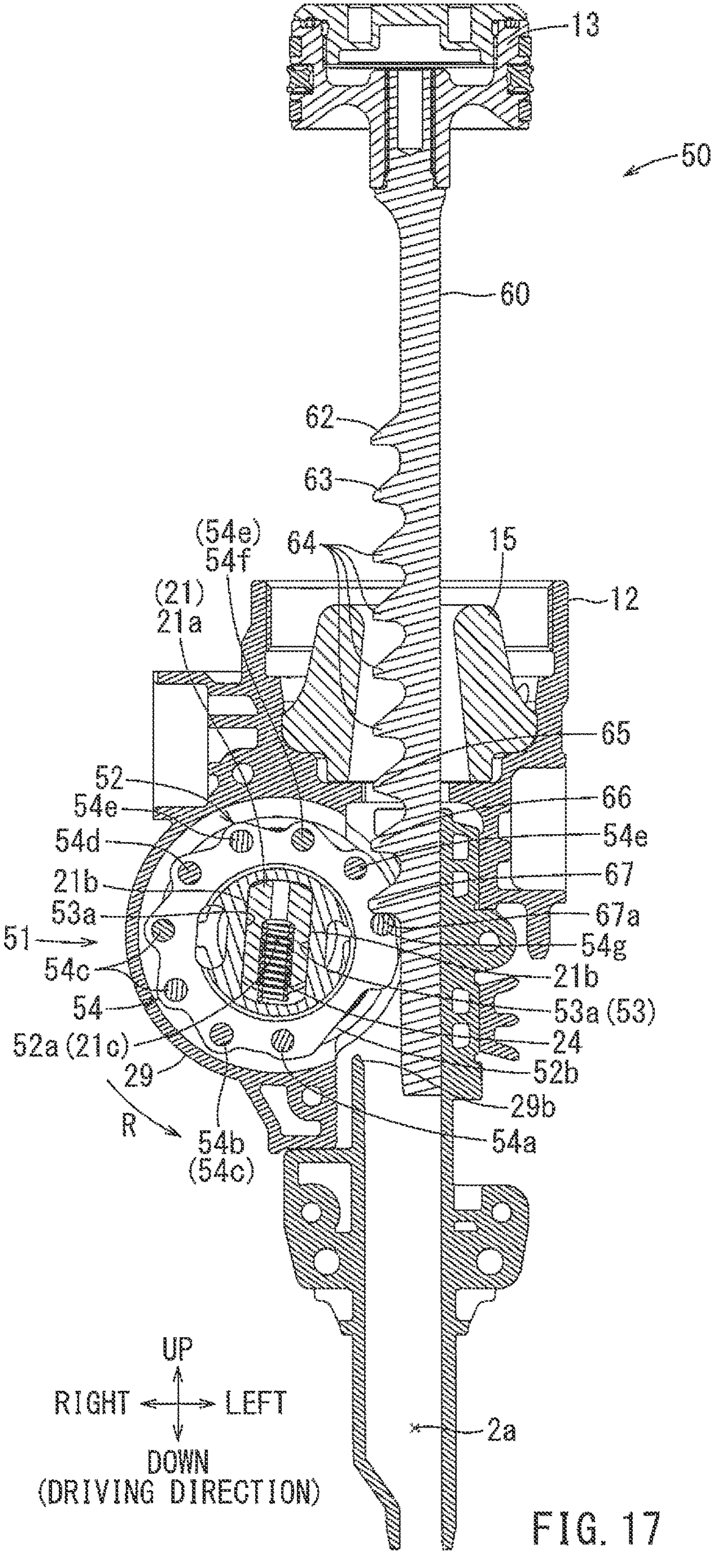
FIG. 17 is a cross-sectional view of the lift mechanism and the driver. This figure illustrates a state in which the wheel is positioned at the initial position, and a last engaging portion is engaged with the engaged surface of the last rack teeth.

As shown in FIG. 17, the wheel 52 stops rotating when the last engaging portion 54*g* is in engagement with the last engaged surface 67*a* of the last rack tooth 67. Therefore, the driver 60 is retained in the standby position. The force applied to the last engaging portion 54*g* from the last engaged surface 67*a* is exerted parallel to the axial direction of the driver 60. This may be done by orienting the last engaged surface 67*a* of the last rack tooth 67 to be orthogonal to the axial direction of the driver 60. This ensures the driver 60 can be securely retained in the standby position against the force in the driving direction applied by the gas pressure.

Figure 19:
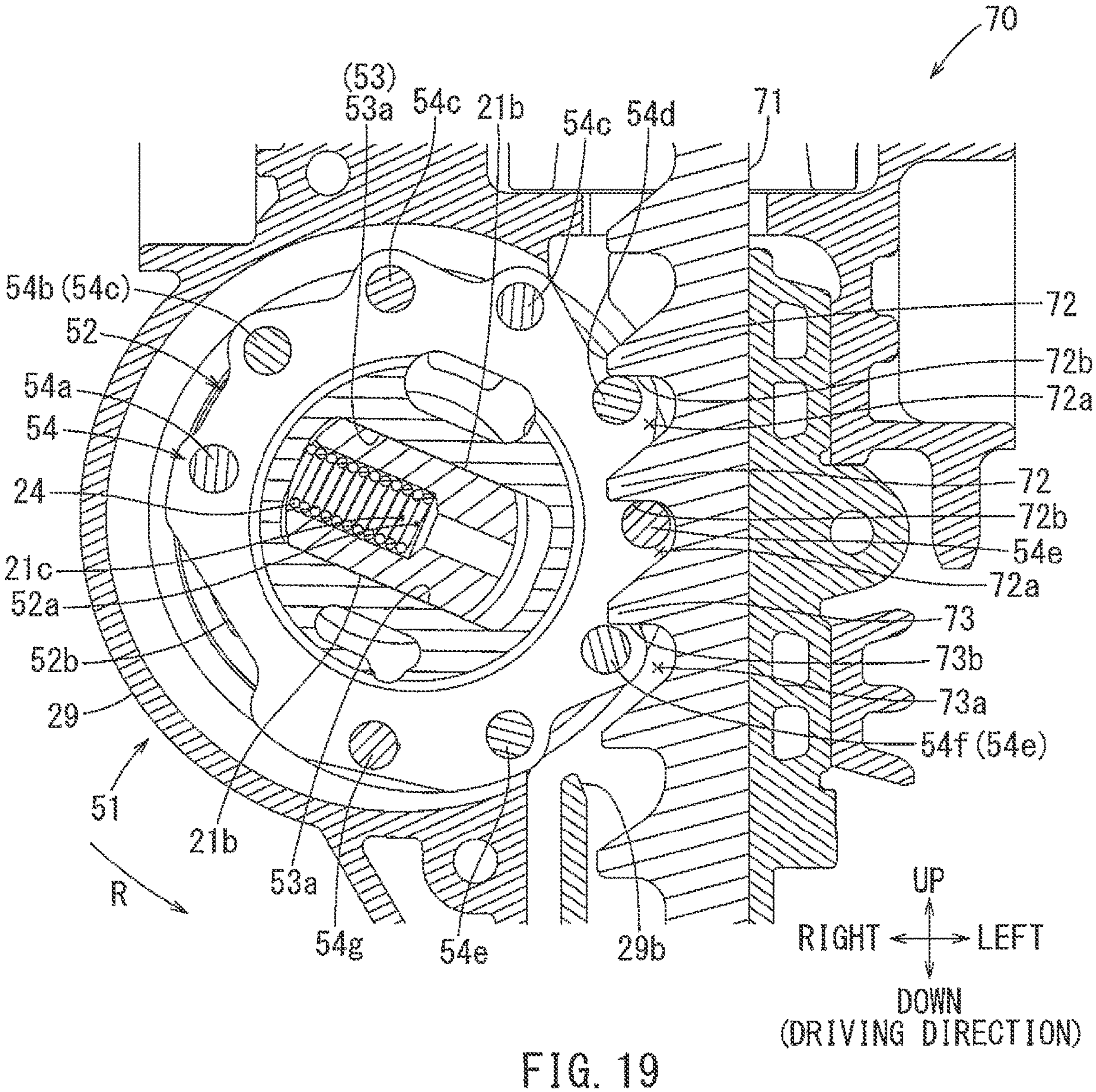
FIG. 19 is a cross-sectional view of a lift mechanism and a driver of a comparative driving tool illustrating a comparative example of the state shown in FIG. 14.
Figure 20:
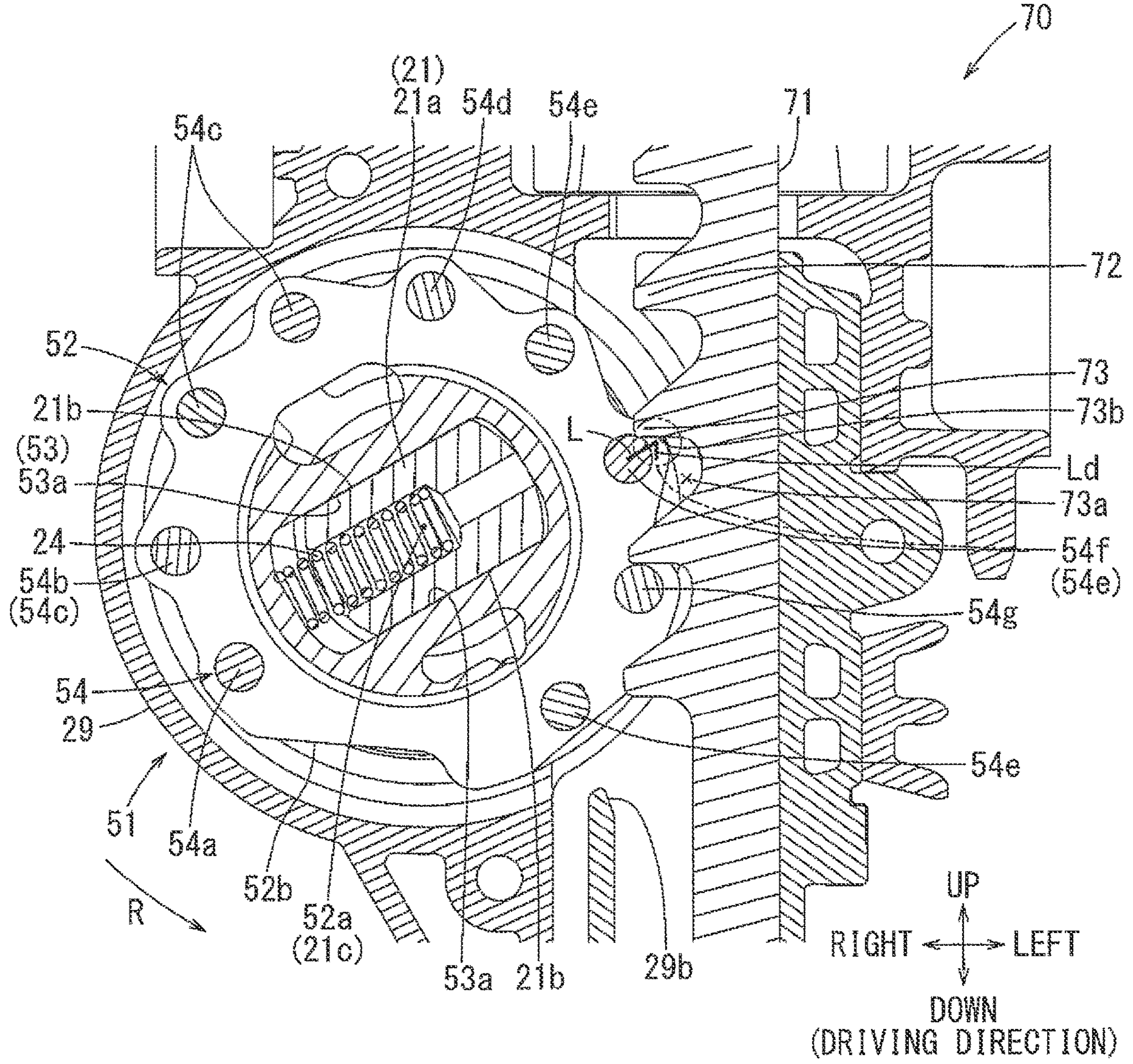
FIG. 20 is a cross-sectional view of a lift mechanism and a driver of a comparative driving tool illustrating a comparative example of a state similar to that shown in FIG. 16.

A comparative example of a driving tool 70, which is to be compared to the second embodiment, is illustrated in FIGS. 19 and 20. A driver 71 of the comparative example is provided with post-advanced rack teeth 72 and a returning rack tooth 73. An internally positioned engaging portion 54*e* immediately before the seventh engaging portion 54*f* enters into the tooth groove 72*a* at a position below the lower post-advanced rack tooth 72 and engages with the post-advanced engaged surface 72*b*. The seventh engaging portion 54*f* enters into the tooth groove 73*a* below the returning rack tooth 73 and engages with the returning engaged surface 73*b*. These engaged surfaces 72*b*, 73*b* are designed to be orthogonal to the axial direction of the driver 71.

As shown in FIG. 19, when the internally positioned engaging portion 54*e* immediately before the seventh engaging portion 54*f* comes to engage with the post-advanced engaged surface 72*b* of the lower post-advanced rack tooth 72, the fifth engaging portion 54*d* located two positions before the seventh engaging portion 54*f* is positioned at a right end (tip end) of the lower post-advanced rack tooth 72. As compared with FIG. 14, although the fifth engaging portion 54*d* is also positioned in the vicinity of the right end of the post-advanced rack tooth 64, the fifth engaging portion 54*d* of the second embodiment is positioned slightly to the left of the right end. The post-advanced rack teeth 64, 72 of the second embodiment and the comparative example would be subjected to a force of substantially the same magnitude from the fifth engaging portion 54*d*. Therefore, the bending moment generated at the tooth root of the post-advanced rack tooth 72 of the comparative example due to the force applied from the fifth engagement portion 54*d* would be greater than the bending moment generated at the tooth root of the post-advanced rack tooth 64 of the second embodiment due to the force applied from the fifth engagement portion 54*d*.

As shown in FIG. 20, when the wheel 52 is shifted from the shifted position to the initial position, the seventh engaging portion 54*f* moves by the same movement amount L in the shift direction of the wheel 52 as in the second embodiment. However, as compared with FIG. 16, a timing at which the wheel 52 shifts to the initial position is earlier in the second embodiment shown in FIG. 16. This is due at least in part to the returning engaged surface 65*b* of the returning rack tooth 65 of the second embodiment being inclined. Therefore, in the case of the comparative example shown in FIG. 20, the shift direction of the wheel 52 when shifting to the initial position is relatively inclined to a greater extent in the axial direction of the driver 60. On the other hand, in the case of the second embodiment shown in FIG. 16, the shift direction is closer to the orthogonal direction orthogonal to the axial direction of the driver 60. Therefore, the movement amount Ld in direction parallel to the driving direction of the seventh engaging portion 54 is smaller in the second embodiment shown in FIG. 16 than in the comparative example shown in FIG. 20. This enables a shorter downwardly returning distance of the driver 60 when the wheel 52 is shifted from the initial position to the shifted position in the second embodiment.

As described-above, the driving tool 50 includes a piston 13, which moves in the driving direction due to gas pressure, as shown in FIG. 11. The driving tool 50 includes a driver 60, which is attached to the piston 13 and moves integrally with the piston 13 to strike a fastener. The driving tool 50 includes a plurality of rack teeth 61 formed at the driver 60 and positioned along the driving direction. The driving tool 50 includes a wheel 52 having a plurality of engaging portions 54 at its outer circumference, the plurality of engaging portions 54 being configured to engage the plurality of rack teeth 61. The driving tool 50 includes a shaft member 21 as a rotation shaft of the wheel 52 to which the wheel 52 is rotatably and radially slidably attached. The wheel 52 rotates to move the driver 60 in a counter-driving direction. The wheel 52 slides from an initial position to a shifted position away from the driver 60 and relative to the shaft member 21 when causing the driver 60 to move in the counter-driving direction. The driver 60 has a tooth groove between each of mutually adjacent rack teeth 61. The tooth grooves include shallow tooth grooves 62*a*, 66*a* to engage with one of the engaging portions 54 when the wheel 52 is at the initial position, and deep tooth grooves 63*a*, 64*a*, which engage with one of the engaging portions 54 when the wheel 52 shifts from the initial position to the shifted position or when the wheel 52 has already shifted the shifted position. The deep tooth grooves 63*a*, 64*a* are deeper than the shallow tooth grooves 62*a*, 66*a*.

Therefore, the engaging portions 54 engage the shallow tooth grooves 62*a*, 66*a* when the wheel 52 is at the initial position. The engaging portions 54 engage with the deep tooth grooves 63*a*, 64*a* when the wheel 52 is shifting from the initial position to the shifted position or when positioned in the shifted position. It is thus possible to maintain a state in which at least one of the engaging portions 54 is engaged with a shallow tooth grooves 62*a*, 66*a* or a deep tooth grooves 63*a*, 64*a* while the driver 60 is caused to move in the counter-driving direction. In particular, when the wheel 52 is shifted from the initial position to the shifted position, the second engaging portion 54*b* is also shifted in a direction away from the bottom of the deep tooth groove 63*a*. The engaging portions 52, which engage the tooth grooves while or after being shifted from the initial position to the shifted position, are disposed at an external position of the wheel 52 so as not to easily be disengaged from the tooth grooves after the wheel 52 has been shifted. Providing the second engagement portion 54*b* at the external position allows the engaging portion 54*b* to stay in the deep tooth groove 63*a* even when the wheel 52 is shifted to the shifted position. Accordingly, it is possible to prevent the plurality of rack teeth 61 from disengaging from the engaging portions 54 while the driver 60 is being lifted in the counter-driving direction. This also prevents the driver 60 from unintentionally being returned in the driving direction. Further, it is possible to prevent the engaging portions 54 from interfering with the engaged surfaces 63*b*, 64*b* (bottom portions) of the advancing rack tooth 63 or the adjacent post-advanced rack teeth 64. This prevents damage to the plurality of rack teeth 61 due to the force received from the engaging portions 54, and enhances the longevity of the plurality of rack teeth 61.

As shown in FIG. 16, the wheel 52 returns from the shifted position to the initial position while the driver 60 is moving in the counter-driving direction. The tooth grooves include a second deep tooth groove 65*a*, which engages with one of the engaging portions 54 as the wheel 52 returns from the shifted position to the initial position. The second deep tooth groove 65*a* is deeper than the shallow tooth grooves 62*a*, 66*a*. After the shaft member 21 has rotated about 180 degrees from the time when the wheel 52 was shifted from the initial position to the shifted position, the wheel 52 may be returned to the initial position. Therefore, the seventh engaging portion 54*f*, immediately before the wheel 52 is returned from the shifted position to the initial position, is positioned so as to have approached the driver 60. Therefore, the seventh engaging portion 54*f* can maintain a state in which the wheel 52 is engaged with the second deep tooth groove 65*a* when the wheel 52 returns from the shifted position to the initial position. When the wheel 52 returns from the shifted position to the initial position, the seventh engaging portion also shifts in the direction away from the bottom of the second deep tooth groove 65*a*. Since the seventh engaging portion 54*f*, before the wheel 52 has returned to the initial position, has approached the driver 60, the seventh engaging potion 54*f* can stay in the second deep tooth groove 65*a* even after the wheel 52 has returned to the initial position. Therefore, it is possible to prevent the returning rack tooth 65, which is on the side of the second deep tooth groove 65*a* in the driving direction, from disengaging from the seventh engaging portion 54*f*. This prevents the returning rack tooth 65 from disengaging from the seventh engaging portion 54*f* while the driver 60 is being moved in the counter-driving direction. As a result, the driver 60 is prevented from inadvertently returning in the driving direction. Before the wheel 52 has been returned to the initial position, it is also possible to prevent the seventh engaging portion 54*f* from interfering with the returning engaged surface (bottom portion) 65*b* of the returning rack tooth 65 positioned on the side of the second deep tooth groove 65*a* in the driving direction. This may be done by forming the second deep tooth groove 65*a* to be deeper. This prevents damage to the returning rack tooth 65 on the side of the second deep tooth groove 65*a* in the driving direction due to the force received from the engaging portion 54, and according enhances longevity.

As shown in FIG. 16, each of the plurality of rack teeth 61 include engaged surfaces to engage with the engaging portions 54 of the wheel 52. The plurality of rack teeth 61 includes a post-advanced rack tooth 64 configured to engage one of the engaging portions 54 when the wheel 52 is at the shifted position. The plurality of rack teeth 61 also include a returning rack tooth 65 configured to engage one of the engaging portions 54 while the wheel 52 returns from the shifted position to the initial position. The returning engaged surface 65*b* of the returning rack tooth 65 is inclined with respect to an orthogonal plane orthogonal to the axial direction of the driver 60. The returning engaged surface 65*b* is inclined in a direction toward the driving direction from tooth tip to tooth root of the returning rack tooth 65. The returning engaged surface 65*b* may be more inclined as compared to the post-advanced engaged surface 64*b* of the post-advanced rack teeth 64 (see FIG. 18).

Therefore, the engaging portion 54 engages the returning engaged surface 65*b* of the returning rack tooth 65 at a relatively earlier timing than would be the case if the returning engaged surface 65*b* were not inclined. This may accelerate the timing at which the wheel 52 returns from the shifted position to the initial position. Accordingly, a shift direction of the wheel 52 may be adjusted to be more in the direction orthogonal to the driving direction of the driver 60 by accelerating the shifting timing of the wheel 52. This may reduce the distance the engaging portions 54 shift in the driving direction of the driver 60 when the wheel 52 returns from the shifted position to the initial position. It is thus possible to reduce the impact force generated between the engaging portions 54 and the returning engaged surface 65*b* of the returning rack tooth 65 at the moment when the wheel 52 is returned to the initial position. This prevents damage to the returning rack tooth 65, and enhances the longevity of the returning rack tooth 65.

As shown in FIG. 13, the plurality of rack teeth 61 include an advancing rack tooth 63 configured to engage one of the engaging portions 54 when the wheel 52 is shifting from the initial position to the shifted position. The advancing engaged surface 63*b* of the advancing rack tooth 63 is inclined with respect to an orthogonal plane orthogonal to the axial direction of the driver 60. The advancing engaged surface 63*b* is inclined in a direction toward the driving direction from the tooth tip to the tooth root of the advancing rack tooth 63. The advancing engaged surface 63*b* is more inclined as compared to the post-advanced engaged surface 64*b* of the post-advanced rack teeth 64 (see FIG. 18).

Therefore, the engaging portions 54 engage the advancing engaged surface 63*b* of the advancing rack tooth 63 at an earlier timing than would be the case if the advancing engaged surface 63*b* were not inclined. This may accelerate the timing at which the wheel 52 shifts from the initial position to the shifted position. Accordingly, the shift direction of the wheel 52 may be adjusted to be more in the direction orthogonal to the driving direction of the driver 60 by accelerating the shifting timing of the wheel 52. This may reduce the distance the engaging portions 54 shift in the driving direction of the driver 60 when the wheel 54 shifts from the initial position to the shifted position. It is thus possible to reduce the impact force generated between the engaging portions 54 and the advancing engaged surface 63*b* of the advancing rack tooth 63 at the moment the wheel 52 shifts to the shifted position. This prevents damage to the advancing rack tooth 63, and enhances the longevity of the advancing rack tooth 63.

As shown in FIG. 16, the post-advanced engaged surface 64*b* of the post-advanced rack tooth 64 is inclined with respect to an orthogonal plane orthogonal to the axial direction of the driver 60. The post-advanced engaged surface 64*b* is inclined in a direction toward the driving direction from the tooth tip to the tooth root of the post-advanced rack tooth 64 (see FIG. 18). Therefore, it is possible to accelerate the engagement timing of transferring from the preceding engaging portion 54 preceding the post-advanced rack tooth 64 to the post-advanced engaged surface 64*b* of the post-advanced rack tooth 64. Thus, the engaging portions 54 and the post-advanced engaged surface 64*b* of the post-advanced rack tooth 64 engage before the preceding engaging portion 54 shifts to the tip end of the preceding rack tooth. This may reduce the bending moment generated at the root of the preceding rack teeth 61, and enhance the longevity of the preceding rack teeth 61.

Various modifications may be made to the above-described embodiments. For instance, a wheel 22 with ten engaging portions 25 and a driver 40 with ten rack teeth 41 were illustrated for the first described lift mechanism 20. In the second described lift mechanism 51, a wheel 52 with nine engaging portions 54 and a driver 60 with nine rack teeth 61 were illustrated. However, the number of the engaging portions 25, 54 and rack teeth 41, 61 shall not be limited to these numbers and may be increased or reduced as needed. The number of engaging portions 25, 54 and the rack teeth 41, 61 may be appropriately determined depending on various factors, such as, for example, a stroke length of the driver 40, the size of the tool body 10, or the like.

A configuration has been illustrated in which the wheel 22 is shifted from the initial position to the shifted position while the second engaging portion 25*b* is engaged with the deep tooth groove 42*a*. A configuration has also been illustrated in which the wheel 22 is shifted from the shifted position to the initial position while the sixth engaging portion 25*d* is engaged with the deep tooth groove 45*a*. A configuration has further been illustrated in which the wheel 52 is shifted from the initial position to the shifted position while the second engaging portion 54*b* is engaged with the advancing engaged surface 63*b* of the advancing rack tooth 63. A configuration has still further been illustrated in which the wheel 52 is shifted from the shifted position to the initial position while the seventh engaging portion 54*f* is engaged with the returning engaged surface 65*b* of the returning rack tooth 65. However, the order of the engaging portions and the timing when the wheel is shifted may be changed, for example, by changing the number of the engaging portions and the rack teeth. Therefore, the order of the rack teeth having deep tooth grooves and the engaged surfaces inclined with respect to the axial direction of the driver may be changed as appropriate.

Although pin-like engaging portions 25 have been illustrated, the shape of the engaging portions 25 shall not limited to this shape. For instance, a plurality of engaging portions may be provided in a pinion teeth manner that are formed along an outer circumferential edge of the wheel 22. A plurality of rack teeth 41 formed at equal intervals in a longitudinal direction of the driver 40 have been illustrated, however, the shape of the rack teeth 41 shall not limited to this shape, and may be formed, for example, at unequal intervals in the longitudinal direction of the driver 40. A configuration has been illustrated in which all engaging portions 25 rotate integrally with the wheel 22 about the rotation axis 21*c*. Alternatively, for example, there may be a configuration that in which only advancing/retracting engaging portions 25*b*, 25*d* are movable with respect to the rotation axis 21*c*.

A driver 40 having a first deep tooth groove 42*a* and a second deep tooth groove 45*a* of substantially the same depth has been illustrated. However, their depths may be different. A driver 40 has been illustrated in which the pitch 43*b* between the upstream rack tooth 43 and the center rack tooth 42 is the same size as the pitch 46*b* between the upstream rack tooth 46 and the center rack tooth 45. It has also been illustrated the driver may have a pitch 42*b* between the center rack tooth 42 and the downstream rack tooth 44 that is substantially the same size as the pitch 45*b* between the other center rack tooth 45 and the other downstream rack tooth 47. Alternatively, each pitch may be different in size. Although a driver 40 has been illustrated in which the tooth thickness 44*c* of the downstream rack tooth 44 and the tooth thickness 47*c* of the downstream rack tooth 47 are substantially the same, their thickness may be different. It has also been illustrated that the rack teeth 41 other than the center rack teeth 42, upstream rack teeth 43, 46, and the downstream rack teeth 44, 47 can have the same shape and equal pitch. However, the shape and pitch of other rack teeth 41 shall not be limited thereto.

A driver 60 has been illustrated in which first deep tooth grooves 63*a*, 64*a* and a second deep tooth groove 65*a* of substantially the same depth are provided. However, their depths may be different. The inclination angle of the engaged surface, the pitch between rack teeth, the tooth thickness of each rack tooth shall not be limited to those illustrated, and may be changed appropriately. The engaged surfaces of the plurality of rack teeth 61 shall not be limited to be straight surfaces, but may instead include curved surfaces, and the curved surfaces may be inclined with respect to the axial direction of the driver 60.

While the embodiments of invention have been described with reference to specific configurations, it will be apparent to those skilled in the art that many alternatives, modifications, and variations may be made without departing from the scope of the present invention. Accordingly, embodiments of the present invention are intended to embrace all such alternatives, modifications, and variations that may fall within the spirit and scope of the appended claims. Embodiments of the present invention should not be limited to the representative configurations, but may be modified, for example, as described above.

The various examples described above in detail with reference to the attached drawings are intended to be representative of the invention and thus non limiting embodiments. The detailed description is intended to teach a person of skill in the art to make, use, and/or practice various aspects of the present teachings and thus does not limit the scope of the invention in any manner. Furthermore, each of the additional features and teachings disclosed above may be applied and/or used separately or with other features and teachings in any combination thereof, to provide improved driving tools.

What is claimed is:

1. A driving tool, comprising:
a piston movable in a driving direction due to gas pressure;
a driver provided at the piston and configured to move integrally with the piston to strike a fastener;
a plurality of rack teeth formed on the driver and along the driver in the driving direction; and
a wheel provided with a plurality of engaging portions at an outer circumference of the wheel, the plurality of engaging portions configured to engage the plurality of the rack teeth, wherein:
the wheel rotates to cause the driver to move in a counter-driving direction opposite the driving direction,
at least one of the plurality of the engaging portions of the wheel is an advancing/retracting engaging portion configured to be movable with respect to a rotation axis about which the wheel primarily rotates,
the plurality of rack teeth includes a first rack tooth, a second rack tooth, and a third rack tooth,
wherein the driver has a first tooth groove defined between the first rack tooth and the second rack tooth, and
a deep tooth groove defined between the second rack tooth and the third rack tooth, and
and wherein the deep tooth groove is configured to receive the advancing/retracting engaging portion and to have a depth greater in a direction perpendicular to the driving direction than the first tooth groove.

2. The driving tool according to claim 1, wherein:
the second rack tooth is a center rack tooth adjacent to the deep tooth groove in the counter-driving direction;
the first rack tooth is an upstream rack tooth adjacent to the center rack tooth in the counter-driving direction, and
a pitch between the center rack tooth and the upstream rack tooth is wider than a pitch between the center rack tooth and the third rack tooth.

3. The driving tool according to claim 2, wherein:
the third rack tooth is a downstream rack tooth adjacent to the center rack tooth in the driving direction,
the plurality of rack teeth includes a fourth rack tooth adjacent to the downstream rack tooth in the driving direction, and
the pitch between the center rack tooth and the downstream rack tooth is narrower than a pitch between the downstream rack tooth and the fourth rack tooth.

4. The driving tool according to claim 3, wherein the downstream rack tooth has a tooth thickness thinner than a tooth thickness of the center rack tooth and than a tooth thickness of the upstream rack tooth.

5. The driving tool according to claim 1, further comprising a shaft member rotatably attached to a tool body, wherein:
the wheel is radially slidably attached to the shaft member,
the wheel rotates with the shaft member, and
all engaging portions of the plurality of engaging portions are radially slidable with respect to the shaft member.

6. The driving tool according to claim 1, wherein:
the advancing/retracting engaging portion is configured to enter the deep tooth groove, and
the advancing/retracting engaging portion is configured to be pressed against a groove bottom of the deep tooth groove so as to move with respect to the rotation axis about which the wheel primarily rotates.

7. The driving tool according to claim 6, wherein the advancing/retracting engaging portion is subjected to a force from the groove bottom of the deep tooth groove that causes the advancing/retracting engaging portion to move in the driving direction.

8. The driving tool according to claim 5, wherein:
the wheel is configured to slide between an initial position where the advancing/retracting engaging portion is separated from the shaft member and a shifted position where the advancing/retracting engaging portion has approached closer to the shaft member,
at least one of the plurality of engaging portions is a first engaging portion, the first engaging portion being configured to first engage the driver when the driver is to be moved to the counter-driving direction after the driver has struck the fastener,
a center of the first engaging portion is positioned on a reference circle that is centered at a rotation axis of the shaft member when the wheel is positioned at the initial position,
the plurality of engaging portions includes an externally positioned engaging portion, a center of the externally positioned engaging portion being positioned radially outside of the reference circle when the wheel is positioned at the initial position, and
the plurality of engaging portions includes an internally positioned engaging portion, a center of the internally positioned engaging portion being positioned radially inside the reference circle when the wheel is positioned at the initial position.

9. The driving tool according to claim 8, wherein each of the plurality of engaging portions are disposed at the wheel so as to come in contact with each of the plurality of rack teeth at equal arc angle while the wheel is rotating.

10. The driving tool according to claim 1, wherein:
the plurality of engaging portions includes a first engaging portion that is configured to engage the driver when the driver is moving in the counter-driving direction after the driver struck the fastener,
the plurality of engaging portions includes a second engaging portion that is configured to engage the driver after the first engaging portion, and
the advancing/retracting engaging portion is the second engaging portion.

11. A driving tool, comprising:
a piston movable in a driving direction due to gas pressure;
a driver provided at the piston and configured to move integrally with the piston to strike a fastener;
a plurality of rack teeth formed on the driver and along the driver in the driving direction;
a wheel provided with a plurality of engaging portions at an outer circumference of the wheel, the plurality of engaging portions being configured to engage the plurality of the rack teeth; and a shaft member configured as a rotation axis of the wheel and to which the wheel is non-rotatably and radially slidably attached, wherein:

the wheel rotates to move the driver in a counter-driving direction opposite the driving direction, the wheel slides from an initial position to a shifted position away from the driver with respect to the shaft member when the wheel moves the driver in the counter-driving direction, the driver has tooth grooves between each of mutually adjacent rack teeth of the plurality of rack teeth, the tooth grooves include a shallow tooth groove, which is configured to engage a first engaging portion of the plurality of engaging portions when the wheel is at the initial position, and the tooth grooves include a deep tooth groove, which is configured to engage a second engaging portion of the plurality of engaging portions when the wheel shifts from the initial position to the shifted position or when the wheel has shifted to the shifted position, and the deep tooth grove is deeper than the shallow tooth groove in a direction perpendicular to the driving direction.

12. The driving tool according to claim 11, wherein:

the wheel returns from the shifted position to the initial position when causing the driver to move in the counter-driving direction, a second deep tooth groove defined between two other mutually adjacent rack teeth of the plurality of rack teeth has a depth greater than the shallow tooth grove in a direction perpendicular to the driving direction, wherein the second deep tooth groove is configured to engage another engaging portion of the plurality of engaging portions when the wheel returns from the shifted position to the initial position.

13. The driving tool according to claim 11, wherein:

the plurality of rack teeth each include an engaged surface configured to engage with a corresponding engaging portion of the wheel, the plurality of rack teeth include a post-advanced rack tooth having an engaged surface configured to engage with one of the plurality of engaging portions when the wheel is at the shifted position, the plurality of rack teeth include a returning rack tooth configured to engage one of the engaging portions when the wheel is returning from the shifted position to the initial position, the engaged surface of the returning rack tooth is inclined, with respect to an orthogonal plane orthogonal to an axial direction of the driver, in a direction toward the driving direction from a tooth tip to a tooth root of the returning rack tooth, and the engaged surface of the returning rack tooth is more inclined than the engaged surface of the post-advanced rack tooth.

14. The driving tool according to claim 13, wherein:

the plurality of rack teeth includes an advancing rack tooth having an engaged surface configured to engage one of the engaging portions when the wheel is shifting from the initial position to the shifted position, the engaged surface of the advancing rack tooth is inclined, with respect to the orthogonal plane orthogonal to the axial direction of the driver, in a direction toward the driving direction from a tooth tip to a tooth root of the advancing rack tooth, and the engaged surface of the advancing rack tooth is more inclined than the engaged surface of the post-advanced rack tooth.

15. The driving tool according to claim 13, wherein the engaged surface of the post-advanced rack tooth is inclined, with respect to the orthogonal plane orthogonal to the axial direction of the driver, in a direction toward the driving direction from a tooth tip to a tooth root of the post-advanced rack tooth.

* * * * *